US009650003B2

(12) United States Patent
Owens et al.

(10) Patent No.: US 9,650,003 B2
(45) Date of Patent: May 16, 2017

(54) IMPACT RESISTANT COMPONENT FOR A VEHICLE

(71) Applicants: GM Global Technology Operations LLC, Detroit, MI (US); Teijin Limited, Osaka (JP)

(72) Inventors: John N. Owens, Franklin, MI (US); Mark A. Voss, Richmond, MI (US); Bhavesh Shah, Troy, MI (US); Venkat Aitharaju, Troy, MI (US); Chris James Tadeusz Wisniewski, Oshawa (CA); Yutaka Yagi, Shelby Township, MI (US); Tsukasa Arai, Shelby Township, MI (US)

(73) Assignees: GM Global Technology Operations LLC, Detroit, MI (US); Teijin Limited, Osaka (JP)

( * ) Notice: Subject to any disclaimer, the term of this patent is extended or adjusted under 35 U.S.C. 154(b) by 0 days.

(21) Appl. No.: 14/321,902

(22) Filed: Jul. 2, 2014

(65) Prior Publication Data
US 2016/0001721 A1 Jan. 7, 2016

(51) Int. Cl.
*B60J 7/00* (2006.01)
*B60R 19/02* (2006.01)
(Continued)

(52) U.S. Cl.
CPC ............ *B60R 19/023* (2013.01); *B62D 25/00* (2013.01); *B62D 25/02* (2013.01); *B62D 25/06* (2013.01);
(Continued)

(58) Field of Classification Search
CPC .. C08L 2666/06; C08L 2666/02; C08L 69/00; C08L 77/06; C08L 67/02;
(Continued)

(56) References Cited

U.S. PATENT DOCUMENTS 3,188,131 A * 6/1965 Attwood .............. B62D 33/046
105/409
3,310,925 A * 3/1967 Le Brun ................... E04D 3/30
52/537

(Continued)

FOREIGN PATENT DOCUMENTS

CN       105292266 A     2/2016
CN       105292267 A     2/2016
(Continued)

OTHER PUBLICATIONS

A First Office Action in Japanese Application No. 2015-130724 from the Japanese Patent Office mailed Jun. 15, 2016, and English translation of Notification of Reason(s) for Refusal (Office Action) by Yuasa and Hara; 11 pages.

(Continued)

*Primary Examiner* — Kiran B Patel
(74) *Attorney, Agent, or Firm* — Harness, Dickey & Pierce, P.L.C.

(57) ABSTRACT

Provided is a load-carrying or non-load carrying structural component for a vehicle having improved impact resistance, such as a gas tank protection shield, an underbody shield, a structural panel, an interior floor, a floor pan, a roof, an exterior surface, a storage area, a glove box, a console box, a trunk, a trunk floor, a truck bed, and combinations thereof. The component has a support structure with ridges, each spaced apart from one another at predetermined intervals, to form a corrugated surface capable of load-carrying. The ridges are longitudinally extending, raised ridges. The corrugated designs provide support structures that are impact resistant.

6 Claims, 10 Drawing Sheets

(51) Int. Cl.
*B62D 25/02* (2006.01)
*B62D 25/06* (2006.01)
*B62D 25/08* (2006.01)
*B62D 25/20* (2006.01)
*B62D 33/02* (2006.01)
*B62D 25/00* (2006.01)
*B62D 29/04* (2006.01)

(52) U.S. Cl.
CPC ........... *B62D 25/087* (2013.01); *B62D 25/20* (2013.01); *B62D 25/2054* (2013.01); *B62D 29/043* (2013.01); *B62D 33/02* (2013.01)

(58) Field of Classification Search
CPC . C08L 77/00; C08L 75/04; B22F 7/06; C08K 5/005
USPC ...... 296/187.03, 187.01; 428/182, 184, 215; 521/139, 180
See application file for complete search history.

(56) References Cited

U.S. PATENT DOCUMENTS

| | | | | |
|---|---|---|---|---|
| 3,331,433 | A | * | 7/1967 | Hagberg ............ B60H 1/00014 165/51 |
| 3,481,643 | A | * | 12/1969 | Campbell .............. B62D 21/10 296/204 |
| 3,868,796 | A | * | 3/1975 | Bush ...................... B60J 5/0452 296/146.6 |
| 4,109,503 | A | * | 8/1978 | Francon ................. B21D 13/02 428/183 |
| 4,128,271 | A | * | 12/1978 | Gray .................. B62D 25/2054 220/23.9 |
| 4,241,146 | A | * | 12/1980 | Sivachenko ............ B21B 1/095 428/124 |
| 4,288,957 | A | | 9/1981 | Meehan |
| 4,341,412 | A | * | 7/1982 | Wayne .................... B60R 13/01 296/39.2 |
| 4,545,172 | A | * | 10/1985 | Wardill ................ B62D 21/152 280/784 |
| 4,726,159 | A | * | 2/1988 | Stohs ........................ E04B 5/40 174/489 |
| 4,770,018 | A | | 9/1988 | Bosl et al. |
| 4,862,666 | A | * | 9/1989 | Kero ........................ E04C 2/08 428/161 |
| 4,867,203 | A | * | 9/1989 | Putter ...................... F16L 9/06 138/98 |
| 5,170,605 | A | | 12/1992 | Huddle |
| 5,188,418 | A | * | 2/1993 | Walworth, Jr. .... B62D 25/2054 296/184.1 |
| 5,421,634 | A | | 6/1995 | Hackett |
| 5,440,998 | A | | 8/1995 | Morgan, IV ....... B65D 19/0048 108/57.18 |
| 5,457,921 | A | * | 10/1995 | Kostrzecha ............... E06B 9/02 52/202 |
| 5,501,055 | A | * | 3/1996 | Storch ...................... E04C 2/06 264/333 |
| 5,579,615 | A | * | 12/1996 | Hoffman .................. E06B 9/00 49/464 |
| 5,722,711 | A | * | 3/1998 | German ............. B60R 13/0206 296/39.2 |
| 5,730,486 | A | * | 3/1998 | Jurica ................ B62D 25/2054 296/184.1 |
| 5,791,118 | A | * | 8/1998 | Jordan ..................... B32B 3/28 428/184 |
| 5,899,519 | A | | 5/1999 | Doshi |
| 5,927,788 | A | * | 7/1999 | Long ...................... B60R 13/01 296/39.2 |
| 5,938,272 | A | * | 8/1999 | Jurica ................ B62D 25/2054 296/184.1 |
| 6,015,178 | A | * | 1/2000 | Haack .................... B60R 13/01 296/39.2 |
| 6,079,168 | A | * | 6/2000 | Shaver ..................... E06B 9/02 49/464 |
| 6,082,810 | A | | 7/2000 | Bennett |
| 6,128,815 | A | * | 10/2000 | Jurica ................ B62D 25/2054 29/417 |
| 6,170,897 | B1 | * | 1/2001 | Karrer ...................... B60P 1/54 296/39.2 |
| 6,347,454 | B1 | * | 2/2002 | Jurica ................ B62D 25/2054 29/417 |
| 6,439,647 | B1 | | 8/2002 | Baldwin |
| 6,439,649 | B1 | * | 8/2002 | Lorenzo ................. B62D 33/00 296/181.3 |
| 6,644,721 | B1 | | 11/2003 | Miskech et al. |
| 6,702,532 | B1 | * | 3/2004 | Throener ............. B60P 7/0892 410/121 |
| 7,152,911 | B1 | | 12/2006 | McNulty et al. |
| 7,290,827 | B2 | * | 11/2007 | McNulty ................ B62D 33/02 296/181.4 |
| 7,416,236 | B2 | | 8/2008 | Boddie et al. |
| 7,687,183 | B2 | | 3/2010 | Lai |
| 7,731,271 | B2 | | 6/2010 | Shelbo et al. |
| 7,819,462 | B1 | | 10/2010 | Owens |
| 7,823,958 | B2 | | 11/2010 | Sato |
| 7,926,866 | B2 | | 4/2011 | Schmidt et al. |
| 8,033,592 | B2 | | 10/2011 | Hsu et al. |
| 8,109,060 | B1 | * | 2/2012 | Motosko ................... E06B 9/00 428/178 |
| 8,123,283 | B2 | | 2/2012 | Edwards et al. |
| 8,276,967 | B1 | * | 10/2012 | Ming-Shun ............ B60R 13/01 296/39.2 |
| 2001/0031185 | A1 | * | 10/2001 | Swensen ................ B60P 7/0807 410/96 |
| 2001/0046588 | A1 | * | 11/2001 | Sturtevant ................ B05D 5/02 428/141 |
| 2002/0149223 | A1 | * | 10/2002 | Saucier ................... B62D 65/04 296/39.2 |
| 2002/0159873 | A1 | * | 10/2002 | Amos ................. B62D 53/0828 414/563 |
| 2003/0047964 | A1 | * | 3/2003 | Jurica .................... B21D 13/00 296/184.1 |
| 2005/0140177 | A1 | * | 6/2005 | Montagna .............. B29C 51/267 296/191 |
| 2005/0142333 | A1 | * | 6/2005 | Montagna ............. B29C 43/146 428/180 |
| 2005/0152774 | A1 | * | 7/2005 | Pierce ...................... B60P 1/00 414/809 |
| 2005/0200062 | A1 | | 9/2005 | Maurer et al. |
| 2005/0236867 | A1 | | 10/2005 | McNulty et al. |
| 2005/0242620 | A1 | | 11/2005 | McNulty et al. |
| 2006/0082191 | A1 | | 4/2006 | McNulty et al. |
| 2006/0106147 | A1 | | 5/2006 | Fasulo et al. |
| 2006/0199890 | A1 | | 9/2006 | Fasulo et al. |
| 2007/0138173 | A1 | * | 6/2007 | Nielsen ................ B65D 88/022 220/4.21 |
| 2007/0237612 | A1 | * | 10/2007 | Mammome ........... B65F 1/1468 414/420 |
| 2007/0299185 | A1 | | 12/2007 | Ottaviani et al. |
| 2008/0150322 | A1 | * | 6/2008 | Shelbo ................. B21D 13/045 296/184.1 |
| 2008/0169674 | A1 | * | 7/2008 | Giles ..................... B60P 7/0892 296/183.1 |
| 2008/0211251 | A1 | * | 9/2008 | Diloreto .................. B60R 13/01 296/39.2 |
| 2010/0098925 | A1 | | 4/2010 | Fasulo et al. |
| 2010/0327616 | A1 | * | 12/2010 | Calhoun ................. B65G 67/24 296/26.09 |
| 2011/0031778 | A1 | * | 2/2011 | Edwards .................. B60R 9/00 296/183.1 |
| 2011/0121225 | A1 | | 5/2011 | Posudievsky et al. |
| 2011/0260500 | A1 | | 10/2011 | Brooks et al. |
| 2013/0069417 | A1 | * | 3/2013 | Wink ........................ B60P 1/12 298/19 R |
| 2013/0122262 | A1 | | 5/2013 | Nagakura et al. |
| 2013/0272780 | A1 | | 10/2013 | Takeuchi et al. |
| 2013/0309001 | A1 | | 11/2013 | Teshima et al. |
| 2013/0313860 | A1 | | 11/2013 | Yamaji et al. |
| 2013/0313862 | A1 | | 11/2013 | Yamaji et al. |
| 2013/0313863 | A1 | | 11/2013 | Yamaji et al. |
| 2013/0317161 | A1 | | 11/2013 | Konagai et al. |

(56) References Cited

U.S. PATENT DOCUMENTS

| | | |
|---|---|---|
| 2013/0344282 A1 | 12/2013 | Yagi et al. |
| 2014/0004308 A1 | 1/2014 | Taniguchi et al. |
| 2014/0035308 A1 | 2/2014 | Suzuki et al. |
| 2014/0039114 A1 | 2/2014 | Hagihara et al. |
| 2015/0108793 A1 | 4/2015 | Peschansky et al. |
| 2015/0109087 A1 | 4/2015 | Golner et al. |
| 2016/0001721 A1 | 1/2016 | Owens et al. |
| 2016/0001816 A1 | 1/2016 | Aitharaju et al. |

FOREIGN PATENT DOCUMENTS

| | | |
|---|---|---|
| DE | 102015110137 A | 1/2016 |
| DE | 102015110302 A1 | 1/2016 |
| JP | S58175928 U | 11/1983 |
| JP | S59167119 U | 11/1984 |
| JP | S6131975 U | 2/1986 |
| JP | 2007528970 A | 10/2007 |
| JP | 2016013830 A | 1/2016 |
| JP | 2016013832 A | 1/2016 |
| WO | WO-2005116478 A2 | 12/2005 |
| WO | 2012/102315 A1 | 8/2012 |
| WO | 2012/105080 A1 | 8/2012 |
| WO | 2012/105387 A1 | 8/2012 |
| WO | 2012/105389 A1 | 8/2012 |
| WO | 2012/105716 A1 | 8/2012 |
| WO | 2012/105717 A1 | 8/2012 |
| WO | 2012/108446 A1 | 9/2012 |
| WO | 2012/117593 A1 | 10/2012 |
| WO | 2012/140793 A1 | 10/2012 |

OTHER PUBLICATIONS

A First Office Action in Japanese Application No. 2015-132442 from the Japanese Patent Office mailed May 6, 2016, English translation of Notification of Reason(s) for Refusal (Office Action) by Yuasa and Nara; 9 pages.

* cited by examiner

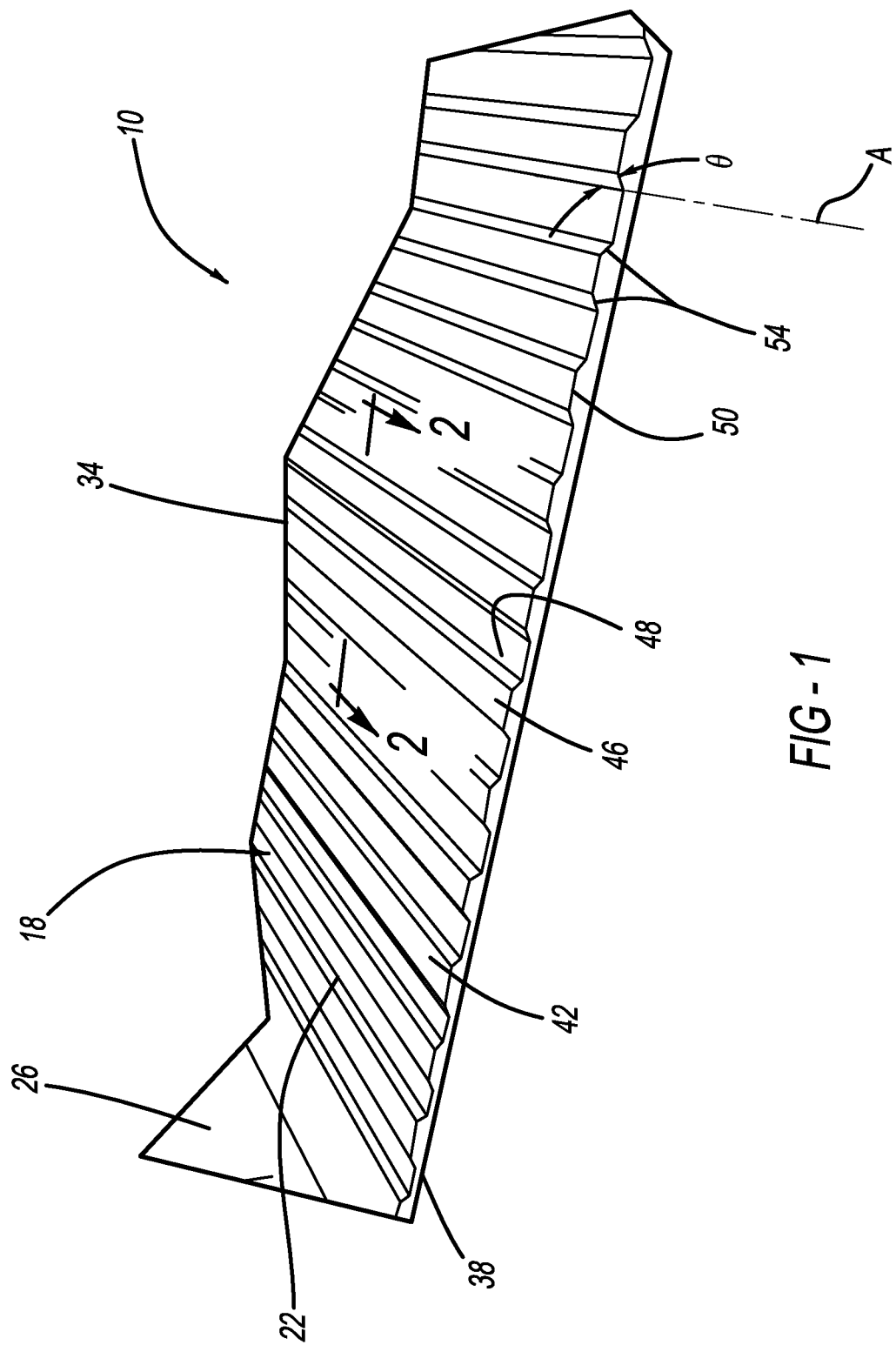

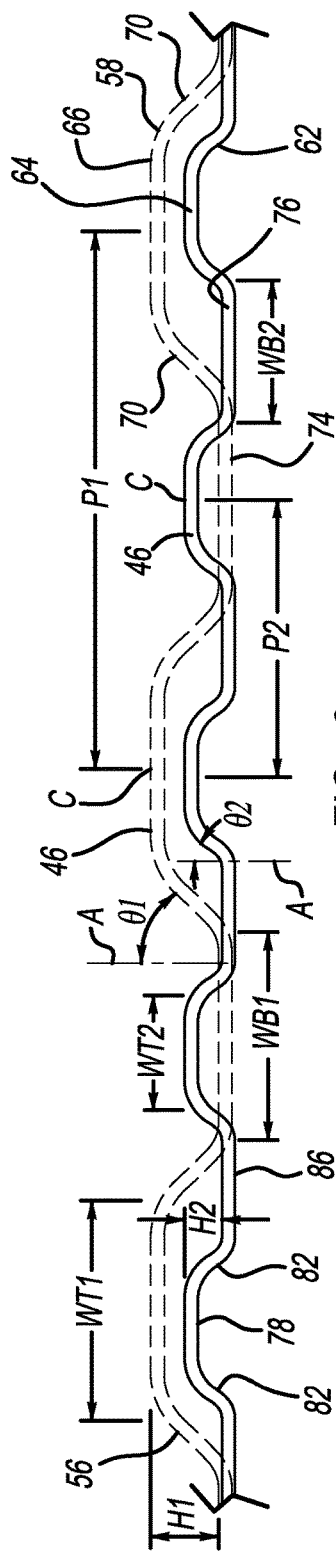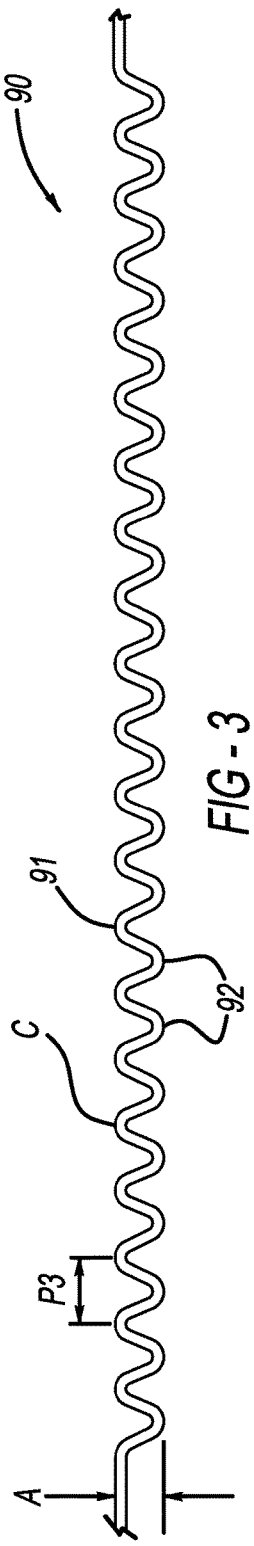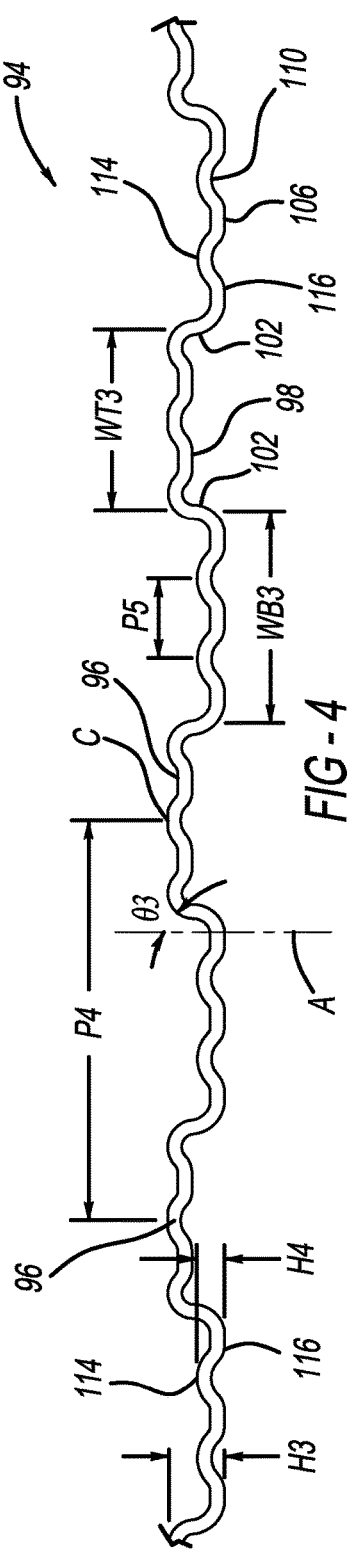

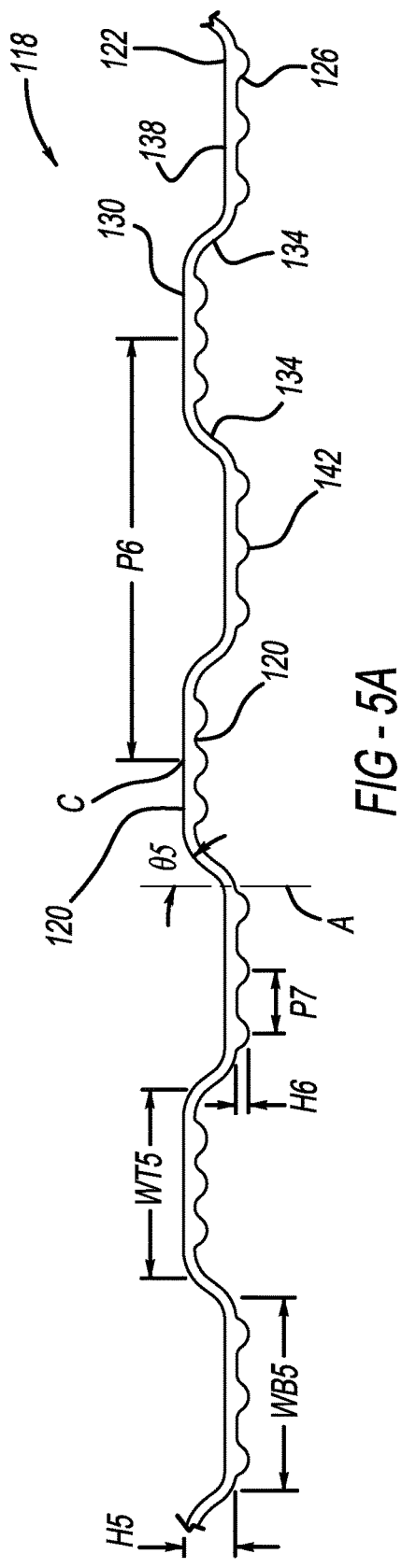
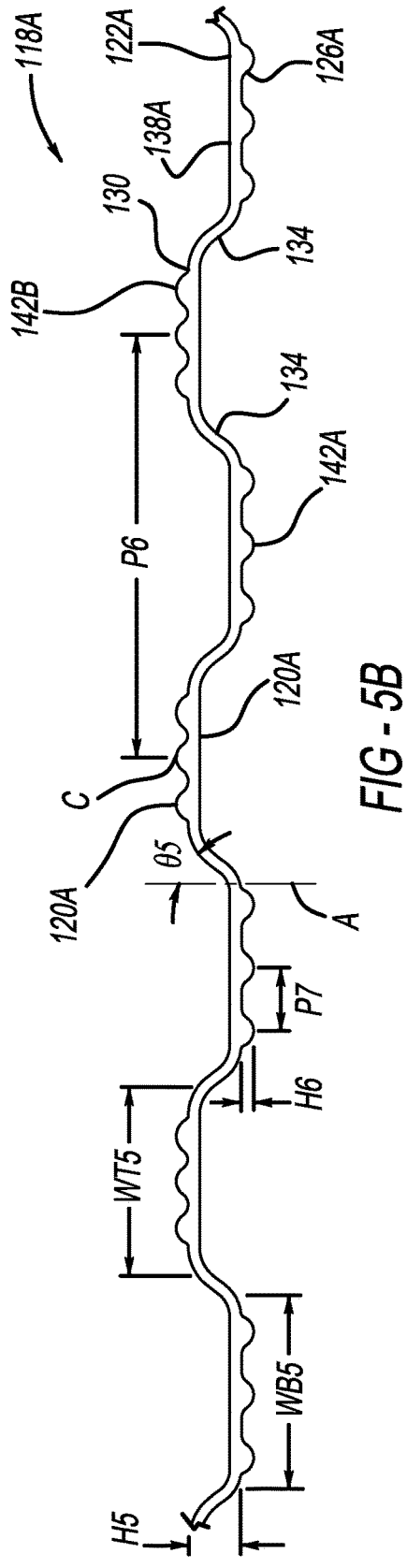
FIG-5A
FIG-5B

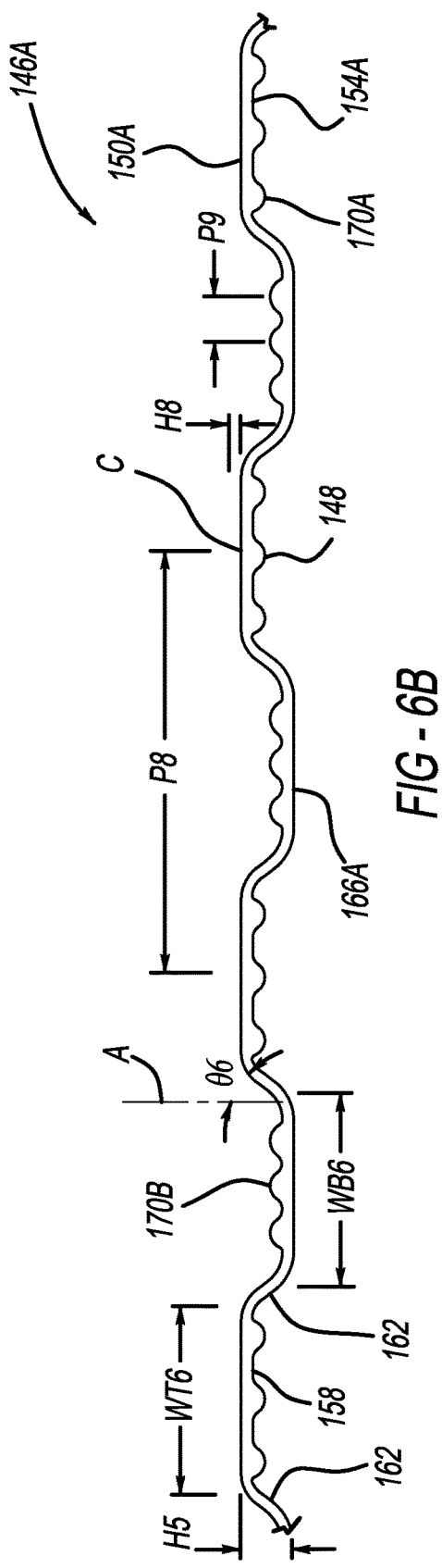
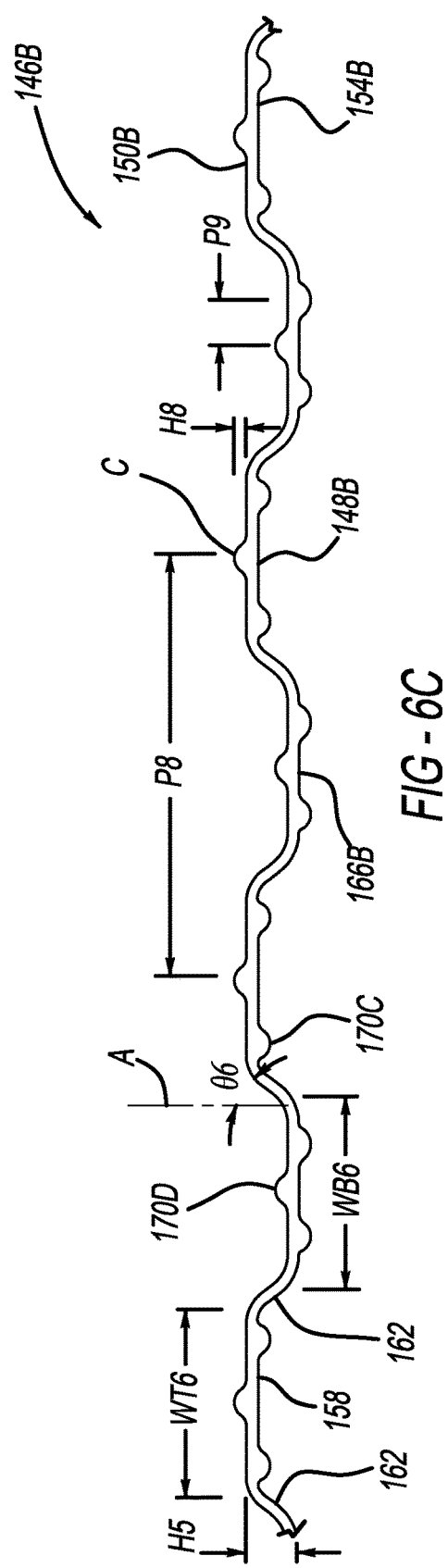
FIG-6B
FIG-6C

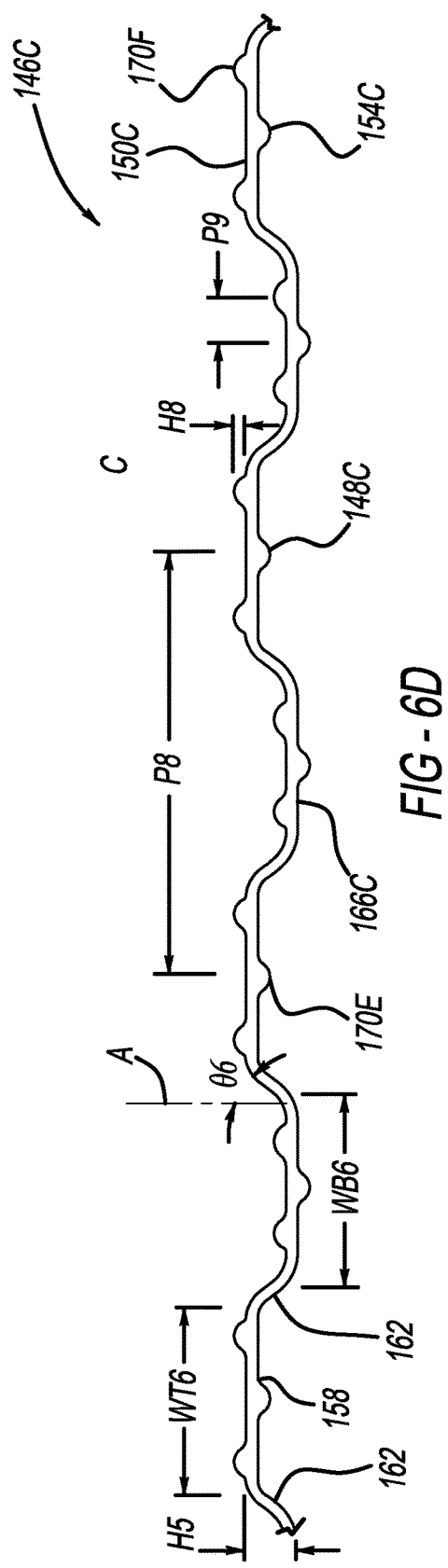

IMPACT RESISTANT COMPONENT FOR A VEHICLE

FIELD

The present disclosure relates to a vehicle or automotive component, such as impact resistant load-bearing structures or impact resistant non-load bearing structures, and more particularly to improved corrugation designs for such impact resistant structures.

BACKGROUND

This section provides background information related to the present disclosure which is not necessarily prior art.

Non-load carrying or load-carrying structures for vehicles or automotive applications facilitate transportation of passengers and cargo from one location to another. Such components are typically made of metals, such as steel or aluminum. Metals provide robust components, including good ductility, strength and impact resistance. Impact resistance and strength are particularly important, as automotive load-carrying structures are often used for construction or industrial use. Such structures typically need to support the weight of other components, equipment, or items within the vehicle, such as cargo, storage items, and passengers carried within the vehicle, and further should exhibit an ability to withstand impact from dropping of heavy and/or sharp objects (e.g., as cargo may be loaded from various heights). While metals have performed well as load-carrying structures for automotive applications, they have a distinct disadvantage in being heavy and reducing gravimetric efficiency and thus fuel economy of a vehicle.

Light-weight reinforced composite materials have been considered as alternative load-carrying surfaces for vehicle applications. However, conventional composite materials have not exhibited the necessary robustness for long-term use in vehicles or other load-carrying applications, as they tend to have limited ductility (increased brittleness) and exhibit reduced impact resistance. Thus, improvements in designs of structures formed of composite materials, so as to provide necessary impact resistance and toughness for commercial and industrial applications, would be highly desirable to improve long-term durability of such structures for both load-bearing or non-load bearing applications, while reducing weight and improving fuel economy.

SUMMARY

This section provides a general summary of the disclosure, and is not a comprehensive disclosure of its full scope or all of its features.

The present disclosure provides improved impact resistant components for both load-carrying and non-load carrying applications. In certain aspects, the components are particularly suitable for use in a vehicle or automobile. The impact resistant component is optionally formed of a composite material. In certain aspects, the present disclosure contemplates an impact resistant component (e.g., for an automobile or vehicle) that comprises a support structure comprising a plurality of elongate ridges formed therein. Each respective elongate ridge of the plurality is spaced apart from adjacent elongate ridges of the plurality at predetermined intervals to form a corrugated surface, which in certain aspects is capable of load-carrying. Further, the support structure comprises a composite material. In certain aspects, a plurality of protrusions may be disposed on the plurality of elongate ridges that defines a predetermined periodicity. Such a support structure is impact resistant and thus resistant to cracking or other mechanical damage.

In other aspects, the present disclosure contemplates an impact resistant component (e.g., for an automobile or vehicle) that comprises a support structure. The support structure includes a plurality of elongate ridges formed therein. Each respective elongate ridge comprises a top wall and two side walls. Further, each respective elongate ridge of the plurality is spaced apart from adjacent elongate ridges of the plurality at predetermined intervals. The support structure is thus capable of load-carrying in certain aspects. Further, the support structure comprises a composite material. A ratio of a width of the top wall to a height of the side walls is optionally greater than or equal to about 1 to less than or equal to about 3. Such a support structure is impact resistant and thus resistant to cracking or other mechanical damage.

In other aspects, the present disclosure contemplates an impact resistant component (e.g., for an automobile or vehicle) that comprises a support structure comprising a plurality of elongate ridges formed therein. Each respective elongate ridge comprises a top wall and two side walls. Further, each respective elongate ridge of the plurality is spaced apart from adjacent elongate ridges of the plurality at predetermined intervals. The support structure further comprises an undulated surface with a predetermined periodicity along the top wall thus forming a corrugated surface, which in certain aspects is capable of load-carrying. Such a support structure is impact resistant and thus resistant to cracking or other mechanical damage.

In yet other aspects, the present disclosure contemplates an impact resistant component for a vehicle that comprises a support structure comprising a plurality of elongate ridges formed therein. The plurality of elongate ridges defines an undulated surface on the support structure with a predetermined periodicity. Such a support structure is impact resistant and thus resistant to cracking or other mechanical damage.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a load-carrying structure for a vehicle having corrugations according to the present disclosure;

FIG. 2 is a sectional view of the corrugations taken at 2-2 from FIG. 1;

FIG. 3 is a sectional view of another embodiment of corrugations according to the present disclosure;

FIG. 4 is a sectional view of still another embodiment of corrugations according to the present disclosure;

FIGS. 5A-5E are sectional views of still other embodiments of corrugations according to the present disclosure;

FIGS. 6A-6D are sectional views of still other embodiments of corrugations according to the present disclosure;

Corresponding reference numerals indicate corresponding parts throughout the several views of the drawings.

DETAILED DESCRIPTION

Figure 5C:
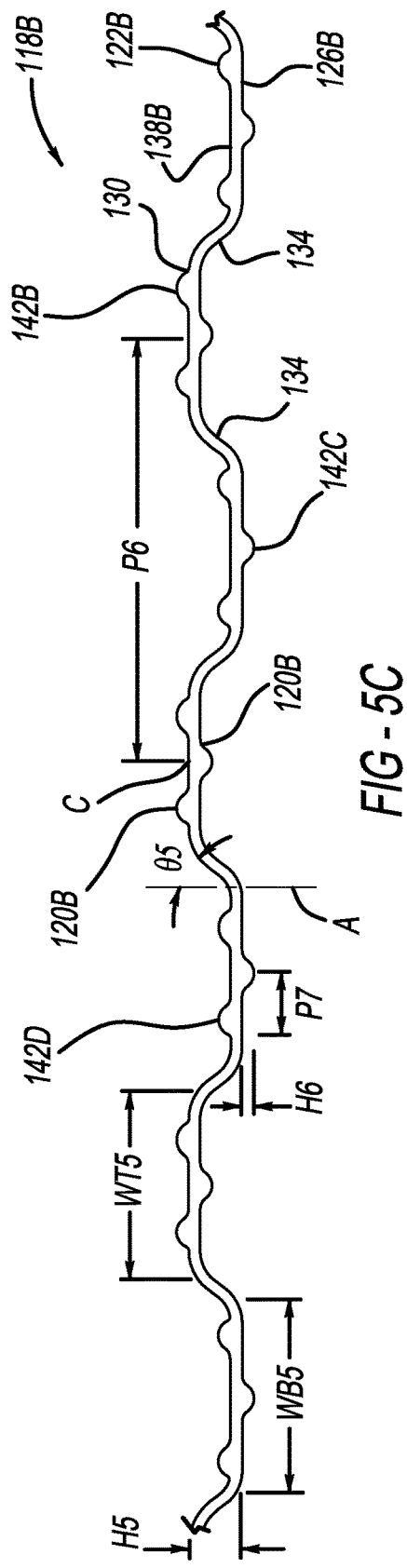

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "bottom," "lower," "above," "top," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Throughout this disclosure, numerical values represent approximate measures or limits to ranges to encompass minor deviations from the given values and embodiments having about the value mentioned as well as those having exactly the value mentioned. Other than in the working examples provided, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range, including endpoints given for the ranges.

Example embodiments will now be described more fully with reference to the accompanying drawings.

In various aspects, the present disclosure provides improved impact resistant components, which may be non-load bearing or non-load carrying or alternatively load-bearing or load-carrying, which are thus suitable for carrying loads. Such impact resistant components may be particularly suitable for use in a vehicle or automobile. While not limiting, the inventive technology is particularly suitable for use with components comprising a polymeric composite material. Referring generally to FIGS. 1-11, improved corrugation designs for such impact resistant components are illustrated. While an exemplary component is illustrated and described throughout the specification, it is understood that the inventive concepts in the present disclosure may also be applied to any impact resistant structural component, including those used in vehicles, like automotive applications including, but not limited to, gas tank protection shields, underbody shields, structural panels, interior floors, floor pans (e.g., of a cargo van), roofs, exterior surfaces, storage areas, including glove boxes, console boxes, trunks, trunk floors, truck beds, and the like. Specifically, the present disclosure is particularly suitable for any piece of hardware subject to loading or impact (e.g., load bearing). In alternative variations, the present disclosure is likewise applicable to any piece of hardware subject to impact that is non-load bearing.

Load-carrying structures can be used to transport some form of cargo for both passenger and cargo trucks, by way of non-limiting example. An exemplary schematic illustration of a section of a vehicle 10 having an impact resistant structural component 18 is shown in FIG. 1. The structural component 18 comprises a support structure or floor 22, which can support a load, such as cargo, and a side wall 26. While the illustrated configuration includes a floor 22 and a single side wall 26, it is noted that multiple components may be used or alternatively may not be present on all structural components, nor are these structures required for implementation of the present disclosure.

The structural component 18 may be made of material that is robust, such as steel, aluminum, composite, or any other material. In certain aspects, the structural component is a material that is capable of supporting loads. While not limiting, the concepts discussed in the present disclosure are particularly suitable for use with structural component 18 formed of a polymeric composite material. For example only, the structural component 18 may be a fiber-reinforced composite comprising a polymer matrix and a plurality of reinforcing fibers distributed therein.

In forming vehicle components (e.g., automotive application components like structural component 18), enhancing structural stiffness, strength and impact resistance, while reducing overall weight is important to improve performance and efficiency. Stiffness is determined by a combination of material modulus (a material property) and geometry of the component or part. When, designing certain vehicle components, such as a structural component floor, stiffness and impact resistance must be balanced. For example, if a structural component is too stiff, the structural component cannot bend sufficiently to absorb energy elastically and all of the impact energy is available to initiate a crack. A structural component with less stiffness can bend to store some energy elastically and thus reduce the energy leftover to minimize cracking. However, stiffness cannot be too low, because a structural component must still have a discernible rigidity for most applications.

While metallic materials, such as steel or aluminum, have relatively high ultimate strain (e.g., about 20% to about 40%) with relatively high strength, stiffness may require improvement. To improve stiffness in metal materials, corrugation height can be increased. Increasing corrugation height increases the overall weight of the component and metals are relatively heavy materials. However, weight reduction is important in vehicles.

A vehicle component formed of a polymeric composite material is lighter in weight, as compared to metal components, and thus provides better fuel economy for a vehicle. A representative weight reduction of a vehicle component formed of a composite material in certain variations of the present teachings is greater than or equal to about 40%, optionally greater than or equal to about 50%, and optionally greater than or equal to about 60% by weight as compared to a metal structure having the same design. The polymer may be formed from or comprise a thermoplastic resin. The fiber-reinforced composite may further include a viscoelastic characteristic. In certain aspects, a suitable fiber-reinforced composite may further include a plurality of carbon fibers.

In certain aspects, the fiber-reinforced composite may be any of the fiber-reinforced composite materials disclosed in U.S. Patent Publication Nos. 2013/0122262 and 2013/0272780, PCT International Publication Nos. WO 2012/117593, WO 2012/105716, WO 2012/102315, WO 2012/105387, WO 2012/105389, WO 2012/105717, WO 2012/108446 and WO 2012/140793, each of which is respectively incorporated herein by reference in its entirety. Particularly suitable fiber-reinforced composite for use as structural components in accordance with the present disclosure are described in PCT International Publication No. WO 2012/105080 and U.S. Patent Publication No. 2015/0108793 filed as U.S. application Ser. No. 14/058,656 on Oct. 21, 2013 entitled "Carbon Fiber Cross Member for Automotive Chassis Structure," each of which is respectively incorporated herein by reference in its entirety.

Thus, suitable fiber-reinforced composite materials may comprise a thermoplastic resin reinforced with a carbon fiber material. The carbon fibers may be provided as fiber mats having interconnecting or contacting fibers or may be randomly distributed individual fibers within the resin matrix. Suitable carbon fibers may include relatively short length fibers (having lengths of ≥ about 0.1 mm to ≤ about 10 mm), relatively long length fibers (having lengths of ≥ about 10 mm to ≤ about 100 mm), or continuous fibers (having lengths of ≥ about 100 mm), and may include any combinations thereof. Long length fibers can provide good balance of moldability/productivity/mechanical performance. The carbon fibers may be chopped, as well.

The carbon fibers within the composite may be configured in a random-oriented manner, for example, in a substantially two-dimensionally-random oriented or in a specific-direction-oriented manner. In certain variations, a fiber mat comprising carbon fibers may be used with highly planar oriented or uni-directional oriented fibers or a combination thereof. The fiber mat may have a random-oriented fiber for good balance of moldability/productivity/mechanical performance. In certain variations, a random carbon fiber mat can be used as a preform of a fiber-reinforced composite material that is shaped. The random mat may include reinforcing carbon fibers having an average fiber length of greater than or equal to about 3 mm to less than or equal to about 100 mm and a thermoplastic resin. Such a random carbon fiber mat is further described in WO 2012/105080 discussed above. In addition, a uni-directional oriented carbon fiber layer may be included in order to enhance local stiffness and strength for the load-carrying support structure.

In certain variations, the fiber-reinforced composite may comprise a carbon fiber material that is surface-modified or grafted with a polymer, such as a copolymerized polyolefin attached to a surface of the carbon fibers. The copolymerized polyolefin may contain an aromatic vinyl compound and an acid and/or acid anhydride as copolymerization components, by way of non-limiting example.

The thermoplastic resin may include any suitable kind of thermoplastic resin. By way of non-limiting example, the thermoplastic resin may include: vinyl chloride resin, vinylidene chloride resin, vinyl acetate resin, polyvinyl alcohol resin, polystyrene resin, acrylonitrile styrene resin, acrylonitrile-butadiene-styrene resin, acrylic resin, methacrylate resin, polyethylene resin, polypropylene resin, polyamide resin (PA6, PA11, PA12, PA46, PA66, PA610), polyacetal resin, polycarbonate resin, polyethylene terephthalate resin, polyethylene naphthalate resin, polybutylene terephthalate resin, polyacrylate resin, polyphenylene ether resin, polyphenylene sulfide resin, polysulfone resin, polyether sulfone resin, polyether ether ketone resin, polylactide resin, or any combination or copolymer of these resins. As appreciated by those of skill in the art, the carbon fiber reinforced composite material may further include other conventional ingredients, including other reinforcement materials, functional fillers or additive agents, like organic/inorganic fillers, fire-retardants, anti-ultraviolet radiation agents (UV stabilizers), anti-oxidants, colorants, mold release agents, softeners, plasticizing agents, surface active agents, and the like.

The carbon fiber reinforced composite material may include a fiber-reinforced layer and a resin layer laminated together. Such fiber-reinforced composite materials may be manufactured from a compression molding process. While thermoplastic resins (e.g., PA6, PC, PP, and the like) have higher elongation values, such materials by themselves do not exhibit sufficient strength. Thus composite materials comprising resins and reinforcing species, such as glass fiber reinforced polymeric composites (GFRP) or carbon fiber reinforced polymeric composites (CFRP) exhibit high strength and reasonable stiffness, while also being light weight (as compared to metals). However, fiber reinforced composites may have relatively low levels of elongation, especially in the case of CFRP (e.g., which may be only about 1% to about 2%). Thus, in certain aspects, if a flat fiber reinforced composite material is used, stiffness will be too low for various applications. Lower stiffness creates large strain under concentrated impact loads, meaning the balance of stiffness and impact resistance could be improved. If a corrugated surface profile design is used, higher stiffness occurs, but then small or low elongation creates local crack or failure under concentrated impact load (hence impact resistance is insufficient). Thus, in accordance with various aspects of the present disclosure, optimized designs are used to form a structural composite material component, such as carbon fiber reinforced composite materials, in a vehicle that exhibits required stiffness, strength and impact resistance.

Strain-to-fail is a material property where a higher value is desirable for vehicle components. In certain aspects, a representative carbon fiber reinforced composite material may have a strain-to-fail value of greater than or equal to about 1%, optionally greater than or equal to about 1.5%, and in certain variations, optionally greater than or equal to about 2%.

In certain aspects, suitable fiber-reinforced composite materials comprise thermoplastic resin reinforced with carbon fiber, for example, a carbon fiber mat, that has a tensile strength ($\sigma$) of greater than or equal to about 200 MPa and a flexural strength (e.g., bending or fracture strength) of greater than or equal to about 300 MPa. A Young's modulus (E) is a mechanical property of a material referring to a ratio of stress to strain ($\sigma/\epsilon$), reflecting the material's elasticity. In certain variations, a material used for the impact resistant component, such as a carbon fiber-reinforced composite, has a Young's modulus (E) of greater than or equal to about 20 GPa to less than or equal to about 30 G Pa.

With renewed reference to FIG. 1, the structural component 18 may include corrugated surface regions 42 on the floor 22. While it is not illustrated in FIG. 1, the structural component 18 may also include corrugated surface regions 42 extending on the side wall 26 (and thus bridging the corner and extending from floor 22 up side wall 26). It should be further noted that the structural component 18 and floor 22 having the corrugated surface regions 42 need not be limited to being entirely planar as shown, but may have undulations, bending, corners, or an otherwise shaped profile. In certain aspects, the corrugated surface regions 42 having such bends, corners, or other shapes can remain close to having a straight-line design. The corrugated surface regions 42 include a plurality of elongate ridge structures or corrugations 46 formed in the material of the structural component 18. The corrugated surface regions 42 include a plurality of corrugations 46 formed in the material of the structural component 18 or as a layer disposed on the floor 22. Corrugated surface regions 42 advantageously increase the strength and rigidity of the supporting surface on which any cargo or load is received. Furthermore, corrugated surface regions 42 raise the cargo or stored items off the floor 22 and thus elevate the cargo above any water or other debris present in or near the structural component 18.

The plurality of corrugations 46 may be elongated ridges, or raised portions, of the structural component 18. Thus, each respective elongate ridge structure or corrugation 46 defines a major longitudinal axis and extends longitudinally from a first side 34 to a second side 38. Further, each respective elongate ridge or corrugation 46 of the plurality is spaced apart from adjacent elongate ridges of the plurality at predetermined intervals to form the corrugated surface regions 42. Thus, a plurality of lower regions 48 (e.g., valley or troughs) are defined between the respective elongate ridge corrugations 46. It should be noted that a corrugation 46 need not extend from first side 34 to second side 38 and also is not limited to the exemplary configuration and orientation shown.

The raised corrugations 46 may be of a generally periodic pattern, meaning that they repeat at regular predetermined intervals. In accordance with various aspects of the present disclosure, specific details and features of the corrugation design and pattern can serve to significantly enhance functionality of the structural component 18 and improve performance of the structural component 18 under impact and loading tests. Such embodiments, as described herein, are particularly suitable for improving strength and impact resistance of composite materials.

Figure 11:
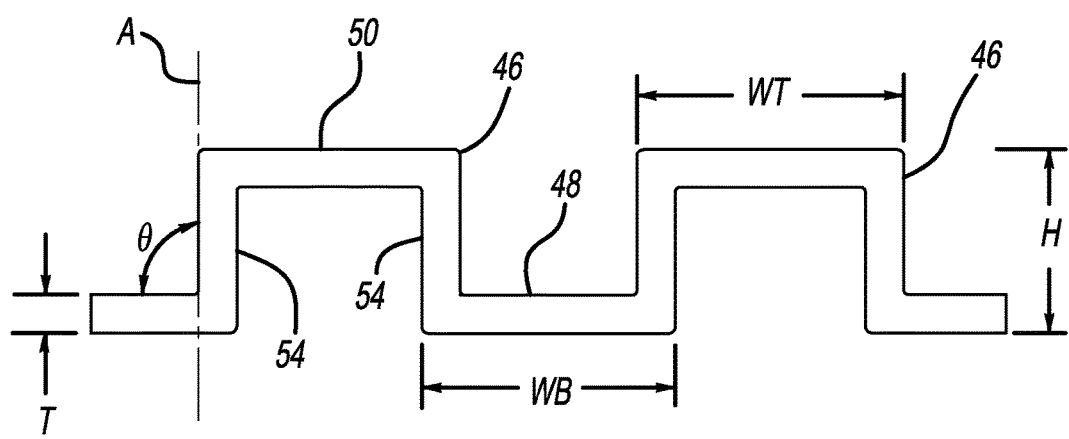
FIG. 11 is a sectional view of a schematic of an exemplary elongated ridge corrugation profile showing relationships between heights, widths, thicknesses, and angles of offset.

As best shown in FIG. 11, each elongated ridge or corrugation 46 has a top wall 50 and a pair of two side walls 54. In some example embodiments, the side walls 54 may be oriented at an angle $\theta$ with respect to a perpendicular line A in relation to the top wall 50. In other examples, the side walls 54 may be perpendicular with respect to the top wall 50.

In industry, vehicle manufacturers and/or suppliers may perform impact and load testing on structural components 18 to determine performance characteristics. A variety of impact and performance tests are well known in the art and may also be employed to determine suitability of impact resistance and/or structural component performance.

For automotive applications, a small object, stone, or corner of a brick or block are typical examples that cause concentrated impact load on a vehicle component, especially on load-carrying structural components, and which may cause failure or damage to due impact. Usually such objects have a relatively small radius (e.g., radius of less than or equal to about 10 mm). The surface must thus be designed to withstand contact and impact from an object having such a relatively small radius.

To further illustrate certain aspects of the present disclosure, FIG. 2 compares a first corrugation surface 56 that is a conventional design and a second corrugation surface 62 that is an exemplary design according to certain aspects of the present disclosure. The first corrugation surface 56 is a corrugation configuration that is conventionally used. The second corrugation surface 62 is an alternative corrugation design in accordance with certain aspects of the present disclosure that improves the impact resistance of the corrugated surface regions 42 of the structural component 18. The first corrugation surface 56 includes a plurality of first conventional elongated channels or corrugations 58 at spaced apart predetermined intervals from one another, separated by lower floor regions or bottom walls 74 disposed therebetween. The first corrugation 58 may include a top wall 66 having a width WT1 and a plurality of side walls 70 having a height H1. Each bottom wall 74 has a width WB1 between respective first corrugations 58. The side walls 70 may define an angle θ1 with respect to the line A extending perpendicularly from the bottom wall 74.

The second corrugation surface 62 includes a plurality of second elongated channels or corrugations 64 spaced apart at predetermined intervals from one another and separated by bottom walls 76. The second corrugation 64 may include a top wall 78 having a width WT2, a plurality of side walls 82 having a height H2. Each bottom wall 76 has a width WB2. The side walls 82 may define an angle θ2 with respect to the line A extending perpendicularly from the lower region bottom wall 76.

The widths WT2 and WB2 and the height H2 of the second corrugation 64 are reduced from the widths WT1 and WB1 and the height H1 of the first corrugation 58 to increase the energy absorbed during impact. Such a corrugation design is particularly well suited for enhancing impact strength of a composite material. As discussed above, in conventional systems, increasing height of the corrugation channels tends to enhance stiffness for composite materials; however, in the designs in accordance with certain aspects of the present disclosure, corrugation height is instead reduced to an optimized intermediate height to improve impact resistance performance of the composite material as a load-carrying structure. Moreover, the corrugated surface designs in accordance with certain aspects of the present teachings reduce the propensity for local cracks or failure under concentrated impact load. Thus, in accordance with various aspects of the present disclosure, composite materials, such as carbon fiber reinforced composite materials, have optimized designs to form a structural component in a vehicle that exhibits required stiffness, strength and impact resistance.

In various aspects, the present disclosure contemplates superior corrugation profiles and designs by optimizing relationships between elongated ridge/corrugation width, corrugation height, material thickness, spacing between elongated ridges/corrugations, wall angles, and the like. A simplified exemplary schematic of a corrugated surface profile is shown in FIG. 11. Each elongated ridge or corrugation 46 is spaced apart at predetermined intervals from adjacent ridges or corrugation 46 by lower regions 48 (or bottom walls). Each corrugation 46 has the top wall 50 and the pair of side walls 54. Thus, WT is a width of top wall 50, WB shows a width of bottom wall or lower region 48, H is a height of each ridge or corrugation 46, while T is thickness of the support structure material.

In certain aspects, a particularly suitable corrugation design may have the following parameters. Width WT of the top wall 50 may be greater than or equal to about 20 mm to less than or equal to about 35 mm, while the width WB of the lower regions 48 at predetermined intervals between elongated ridges or corrugations 46 may be greater than or equal to about 20 mm to less than or equal to about 40 mm. Such a range of widths WT and WB provides a sufficient number of corrugation ridges per unit area (corrugation density) to ensure that larger objects, like cement blocks or other cargo, hit and distribute impact of a sufficient amount of corrugations. Decreasing the WT to a dimension that is too small penalizes the mass efficiency of the support structure by increasing the number of corrugations per unit area present and thus the overall mass of the component. If the width WT is smaller, the number of corrugations increases, meaning unit mass of a corrugation becomes heavier (because vertical walls have a diminished effect in enhancing the stiffness). Therefore, as WT is decreased, a larger ratio of composite material is used in the vertical walls of the structural component. Thus, in certain aspects, the design of the corrugated surface minimizes mass, so that a larger WT dimension is favorable. However, if WT gets to be too large, then the impact resistance is diminished. In certain variations, the dimensions of WT are such that the corrugations can provide adequate support for a representative object (e.g., a cement block) with at least two corrugation ridges over the object's surface.

Regarding the height H of side walls 54, a lower height tends to be better for impact; however, a higher height tends to provide better stiffness of the support structure. Thus, in accordance with certain aspects, a particularly suitable height H for side walls 54 may be greater than or equal to about 10 mm to less than or equal to about 18 mm, optionally greater than or equal to about 10 mm to less than or equal to about 13 mm to balance impact resistance with stiffness. As noted above, in certain variations, the material forming the structural component 18 may comprise a composite material, such as a carbon-fiber reinforced thermoplastic polymer composite material, having a Young's modulus (E) of greater than or equal to about 20 GPa to less than or equal to about 30 GPa. In certain particular variations, a ratio of height (H) the corrugation side wall 54 to Young's modulus (E) (H:E) is greater than or equal to about 0.4 mm/GPa to less than or equal to about 1 mm/GPa, optionally greater than or equal to about 0.4 mm/GPa to less than or equal to about 0.75 mm/GPa, and in certain variations, optionally greater than or equal to about 0.4 mm/GPa to less than or equal to about 0.65 mm/GPa.

The thickness (T) of the support structure material may be greater than or equal to about 1.5 mm to less than or equal to about 5 mm, and optionally greater than or equal to about 2.5 mm to less than or equal to about 4 mm, in certain variations.

The present disclosure also contemplates that the corners formed between top wall 50 and side wall 54 or between side wall 54 and lower region 48 in any of the embodiments may be rectangular, rounded, or beveled and any combinations thereof. For example, the side walls 54 may be oriented at an angle θ with respect to the lower regions 48 or top wall 50. As shown in FIG. 11, θ is an angle defined between the bottom wall/lower region 48 and side wall 54 and is shown to be orthogonal or 90°. Stated in another way, angle θ may be offset from a perpendicular line A in relation to the top wall 50 by greater than or equal to 0° to less than or equal to about 20° and in certain aspects, optionally greater than or equal about 5° to less than or equal to about 10°. While a lower offset angle θ tends to be more desirable to provide better impact resistance, the ability to form such low offset angles can be limited by manufacturing processes.

With renewed reference to FIG. 2, for example only, the width WT1 of the conventional first corrugation 58 may thus be greater than or equal to about 22 millimeters (mm), the width WB1 may be greater than or equal to about 30 mm, the height H1 may be greater than or equal to about 15 mm, and the angle θ1 may be within a range of greater than or equal to 0 degrees to less than or equal to about 40 degrees, optionally greater than or equal to about 3 degrees to less than or equal to about 40 degrees, and in certain variations, greater than or equal to about 3 degrees to less than or equal to about 10 degrees. For example only, the width WT2 of the second corrugation 64 may be within a range of greater than or equal to about 20 mm to less than or equal to about 35 mm, the width WB2 may be within a range of greater than or equal to about 20 mm to less than or equal to about 40 mm, the height H2 may be within a range of greater than or equal to about 10 mm to less than or equal to about 18 mm, optionally greater than or equal to about 10 mm to less than or equal to about 13 mm, and the angle θ2 may be within a range of greater than or equal to about 3 degrees to less than or equal to about 40 degrees, optionally greater than or equal to about 3 degrees to less than or equal to about 10 degrees, and in certain variations, optionally greater than or equal to about 5 degrees to less than or equal to about 10 degrees.

The shapes of the first corrugation surface 56 and the second corrugation surface 62 are periodic and repeat at predetermined intervals, so that each has a period of oscillation P1 and P2 (extending from one corrugation to an adjacent corrugation), respectively. The period P2 of the second corrugation surface 62 is approximately half of the period P1 of the first corrugation surface 56. The reduced height H2, narrower widths WT2 and WB2, and decreased period P2 (e.g., larger number of corrugations per unit area) allows for increased performance under impact. During impact, the energy distributed to the second corrugations 64 of the second corrugation surface 62 (e.g., 42 in FIG. 1) or the impact energy, is dissipated or stored elastically, thus reducing the probability of failure during impact.

The second corrugation surface 62 thus has improved impact resistance over conventional designs, like first corrugation surface 56. Impact resistance testing is a way of rating the resistance of a component to cracking or breakage when struck by an impact force. Various well-known standards specify the requirements for the impact testing, including the type and weight of the striker, also known as the Tup, the impact force, and the specimen support (either a v-block of a flat plate). There are three types of Tup strikers used for testing: Type A is a cone with a rounded point, Type B is a cylinder with a relatively flat surface, and Type C has a 0.5 inch diameter pin with a rounded or hemispherical end. The Tup striker is allowed to fall free and strike the specimen, but is typically connected to a cable that prevents it from bouncing or rebounding and striking the specimen again after the initial strike. The test specimen is then inspected for any signs of cracking or failure. In certain variations, the impact energy test used to determine such impact energy to first crack in accordance with certain aspects of the present disclosure is a Type C conducted with a 0.5 inch hemispherical tup striker, as is well known in the art.

For example, an impact testing machine may be a small drop tower that uses a fixed weight (approximately 7 kg) carriage (the tup is rigidly attached to the carriage). The height of the carriage is controlled immediately before dropping. Impact energy is calculated as IE=mgh where m is mass, h is drop height, and g is acceleration (gravitational constant). Drop testing may begin at a low height. The height is then gradually increased until a crack is observed. A second new sample is then used to test directly with the final height (where the crack occurred) to confirm the value.

Therefore, in certain aspects, the second corrugation surface 62 is impact resistant. In certain variations, the second corrugation surface is capable of withstanding greater than or equal to about 8 Joules of impact energy before cracking under the test conditions described above, optionally greater than or equal to about 9 Joules of impact energy before cracking, optionally greater than or equal to about 10 Joules, optionally greater than or equal to about 11 Joules, and optionally greater than or equal to about 12 Joules of impact energy before cracking, by way of non-limiting example. The impact energy test to determine such impact energy to first crack is conducted with a 0.5 inch hemispherical tup striker and tested with a Dynatup carriage assembly of 7 kg, as is described above. As discussed further below, the comparative first corrugation surface 56 formed of the same material as the second corrugation surface 62 (e.g., an advanced carbon-fiber reinforced composite) is only capable of withstanding about 4 Joules of impact energy before cracking occurs.

In certain variations, the support structure is formed of a composite material, such as a carbon-fiber reinforced thermoplastic polymer composite material. The composite material has a Young's modulus (E) of greater than or equal to about 20 GPa to less than or equal to about 30 GPa, in certain aspects. In certain particular variations, a ratio of height (e.g., H2) the corrugation side wall 82 to Young's modulus (E) of the support structure material is greater than or equal to about 0.4 mm/GPa to less than or equal to about 1 mm/GPa, optionally greater than or equal to about 0.4 mm/GPa to less than or equal to about 0.75 mm/GPa, and in certain aspects, optionally greater than or equal to about 0.4 mm/GPa to less than or equal to about 0.65 mm/GPa.

Accordingly, the present disclosure contemplates an impact resistant structural component, which may be used for a vehicle for example, comprising a support structure that may comprise a plurality of elongate ridges formed therein. Each respective elongate ridge comprises a top wall and two side walls. Further, each respective elongate ridge of the plurality is spaced apart from adjacent elongate ridges of the plurality at predetermined intervals to form a corrugated surface capable of load-carrying. The support structure optionally comprises a composite material. In certain variations, the composite material comprises a polymeric resin and a carbon fiber reinforcement material. A ratio of a width of the top wall (e.g., WT2) to a height of the side walls (e.g., H2) is greater than or equal to about 1 to less than or equal to about 3, while the support structure exhibits impact resistance. In certain aspects, the support structure is capable of withstanding greater than or equal to about 8 Joules of impact energy before cracking under the test conditions discussed above. In certain aspects, a ratio of a width of the top wall to a height of the side walls is greater than or equal to about 1.25 to less than or equal to about 2.75.

In certain aspects, a height of the side walls (e.g., H2) for the elongate ridge is less than or equal to about 18 mm, optionally less than or equal to about 17 mm, optionally less than or equal to about 16 mm, optionally less than or equal to about 15 mm, optionally less than or equal to about 14 mm, optionally less than or equal to about 13 mm, optionally less than or equal to about 12 mm, optionally less than or equal to about 11 mm, and in certain variations, optionally less than or equal to about 10 mm. In certain variations, the height of the side walls for the elongate ridge is optionally greater than or equal to about 10 mm to less than or equal to about 18 mm, optionally greater than or equal to about 10 mm to less than or equal to about 13 mm, and demonstrates superior impact resistance (e.g., at least about 8 Joules discussed above).

As noted above, in certain variations, the material comprises a composite material, such as a carbon-fiber reinforced thermoplastic polymer composite material. The composite material may have a Young's modulus (E) of greater than or equal to about 20 GPa to less than or equal to about 30 GPa, in certain aspects. In certain variations, a ratio of height (e.g., H2) the corrugation side wall 54 to Young's modulus (E) of the support structure material is greater than or equal to about 0.4 mm/GPa to less than or equal to about 1 mm/GPa, optionally greater than or equal to about 0.4 mm/GPa to less than or equal to about 0.75 mm/GPa, and in certain aspects, optionally greater than or equal to about 0.4 mm/GPa to less than or equal to about 0.65 mm/GPa.

In other aspects, a width of the top wall (e.g., WT2) of the elongate ridge may be less than or equal to about 35 mm, optionally less than or equal to about 34 mm, optionally less than or equal to about 33 mm, optionally less than or equal to about 32 mm, optionally less than or equal to about 31 mm, and in certain aspects, optionally less than or equal to about 30 mm. In certain variations, the width of the top wall is optionally less than or equal to about 29 mm, optionally less than or equal to about 28 mm, optionally less than or equal to about 27 mm, optionally less than or equal to about 26 mm, optionally less than or equal to about 25 mm, optionally less than or equal to about 24 mm, optionally less than or equal to about 23 mm, optionally less than or equal to about 22 mm, optionally less than or equal to about 21 mm, and in certain aspects, less than or equal to about 20 mm. In certain aspects, a width of the top wall may be greater than or equal to about 19 mm to less than or equal to about 35 mm, optionally greater than or equal to about 20 mm to less than or equal to about 35 mm, and in certain variations, greater than or equal to about 20 mm to less than or equal to about 25 mm. In certain aspects, such a component may demonstrate an impact resistance of at least about 8 Joules discussed above. In certain other variations, the width of the top wall is optionally greater than or equal to about 20 mm to less than or equal to about 22 mm and demonstrates superior impact resistance (e.g., at least about 8 Joules), as discussed above.

Further, in certain variations, the lower regions (e.g., WB2) between respective elongate ridges of the plurality of elongate ridges have a predetermined dimension or width of greater than or equal to about 20 mm to less than or equal to about 40 mm and optionally greater than or equal to about 25 mm to less than or equal to about 30 mm in certain variations. It should be noted while in the embodiment described here that each respective elongate ridge has the same dimensions and spacing between ridges, that in alternative aspects, each respective elongate ridge or corrugation need not be of the same dimensions as other elongate ridges, but may vary in design, dimensions, or spacing from others elongate ridges or corrugations.

Figure 7:
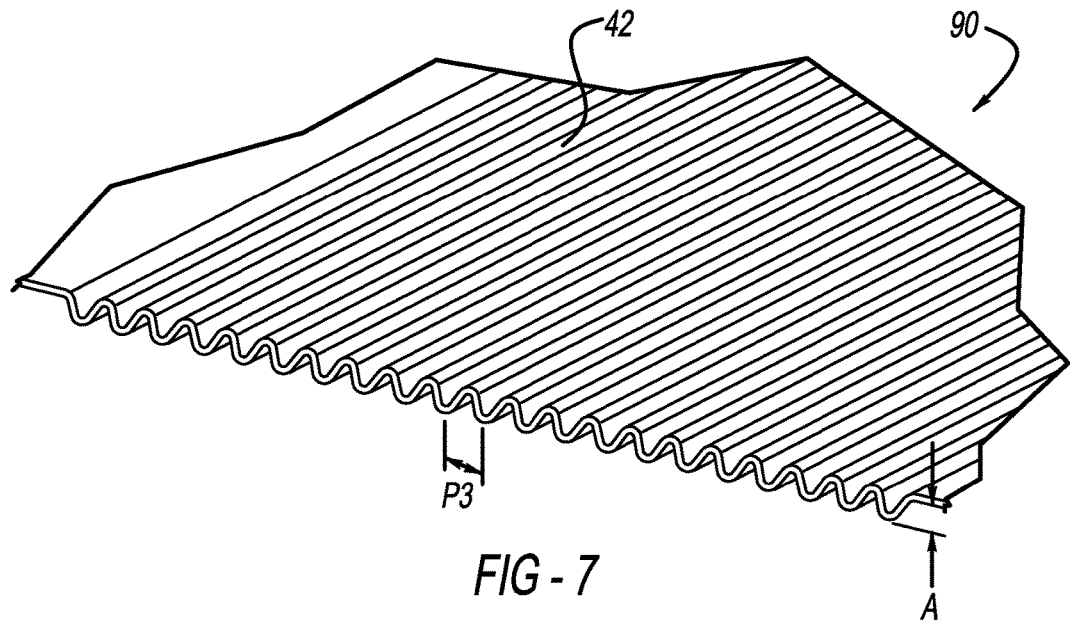
FIG. 7 is a perspective view of the corrugations of FIG. 3.

In another example embodiment, referring specifically to FIGS. 3 and 7, a third corrugation surface 90 is illustrated. FIG. 3 illustrates a section view of the third corrugation surface 90, and FIG. 7 illustrates the third corrugation surface 90 implemented within the structural component 18. The third corrugation surface 90 includes a plurality of third elongate ridges or peaks 91 and a plurality of elongate troughs or valleys 92 that define an undulated surface profile, which is periodic and may be in the shape of a sinusoidal wave. Such an undulated surface may include an amplitude A extending from a lowest point of valley 92 to a highest point of peak 91 that is similar to the height H2 of the second corrugation surface 62 and less than the height H1 of the first corrugation surface 56 in FIG. 2. The frequency of the oscillation of the third corrugation surface 90 is approximately eight times the frequency of the oscillation of the first corrugation surface 56 (FIG. 2). The third corrugation surface 90 has a period of the undulations P3 or period of oscillation (e.g., from a first peak 91 to a second peak 92) of the third corrugation surface 90 of greater than approximately ⅛ the period of the undulations P1 of the first corrugation surface 56. If P3 is less than ⅛ the period of undulations P1 of a conventional design, moldability may become too difficult. In various aspects, a height or amplitude A is greater than or equal to about 10 mm to provide sufficient stiffness. A thickness of third corrugation surface 90 is greater than or equal to about 2.5 mm to less than or equal to about 3 mm in certain examples. This design demonstrates good impact resistance it is not very mass efficient and therefore has received little attention.

The third corrugation surface 90 allows for increased global bending over the first conventional corrugation surface 56, resulting in a corrugation surface that absorbs and elastically stores impact energy. Thus, the probability of failure of the structural component 18 during impact is reduced.

Thus, in certain aspects, an impact resistant component for a vehicle is provided that includes a support structure comprising a plurality of elongate ridges formed therein. The plurality of elongate ridges defines an undulated surface on the support structure with a predetermined periodicity. The support structure is impact resistant. In certain variations, the impact resistant support structure is capable of withstanding greater than or equal to about 15 Joules of impact energy before cracking under the test conditions previously described above, optionally greater than or equal to about 16 Joules, optionally greater than or equal to about 17 Joules, optionally greater than or equal to about 18 Joules, optionally greater than or equal to about 19 Joules, optionally greater than or equal to about 20 Joules, optionally greater than or equal to about 21 Joules, optionally greater than or equal to about 22 Joules, optionally greater than or equal to about 23 Joules, and in certain variations, optionally greater than or equal to about 24 Joules of impact energy before any cracking occurs.

Figure 8:
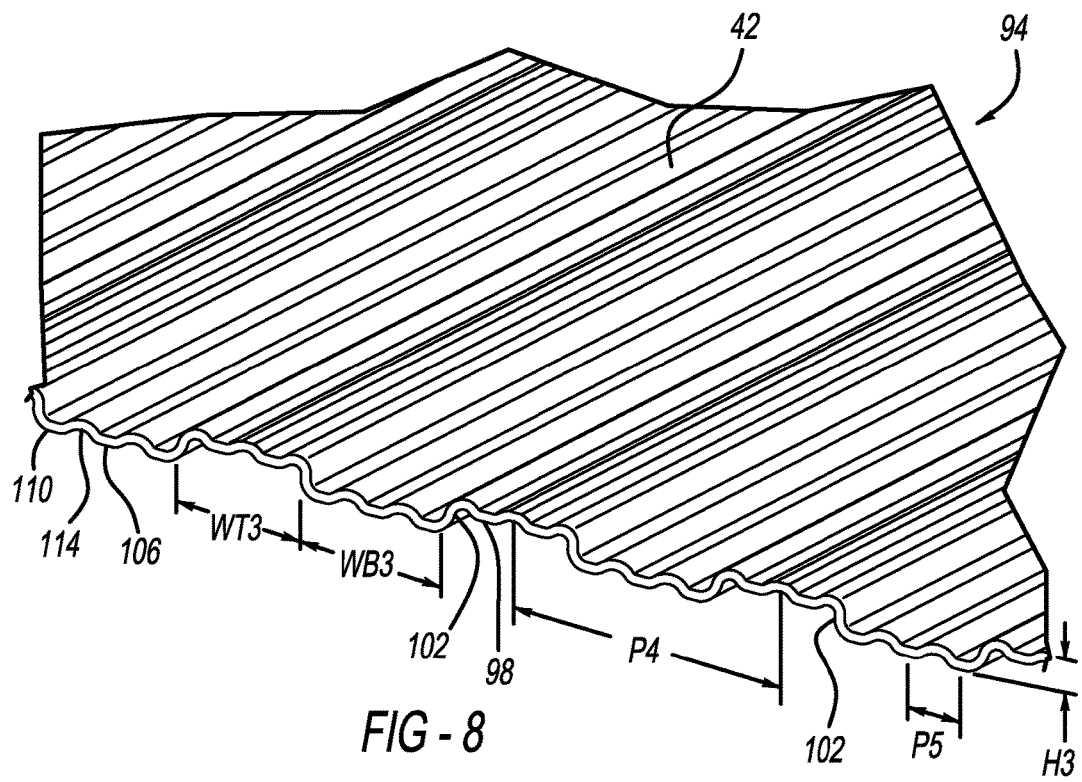
FIG. 8 is a perspective view of the corrugations of FIG. 4.

In another example embodiment, referring specifically to FIGS. 4 and 8, a fourth corrugation surface 94 is illustrated. FIG. 4 illustrates a section view of the fourth corrugation surface 94, and FIG. 8 illustrates the fourth corrugation surface 94 implemented within the structural component 18. The fourth corrugation surface 94 comprises a plurality of fourth elongated channels or corrugations 96 at spaced apart predetermined intervals from one another, separated by lower regions or bottom walls 106 disposed therebetween. The fourth corrugation 96 may include a top wall 98 having a width WT3, a plurality of side walls 102 having a height H3, and a bottom wall 106 having a width WB3. The side walls 102 may be at an angle θ3 with respect to the line A extending perpendicularly from the bottom wall 106. The widths WT3 and WB3 and the height H3 of the fourth corrugation 96 in fourth corrugation surface 94 are reduced from the widths WT1 and WB1 and the height H1 of the first corrugation surface 56 (FIG. 2) to increase the energy absorbed during impact. For example, the widths WT3 and WB3 and the height H3 may be any of those described above in the context of the second corrugation surface 62 (as WT2, WB2, H2, and the like). By way of example, the width WT3 of the fourth corrugation 96 may be greater than or equal to about 20 mm to less than or equal to about 35 mm, the width WB3 may be greater than or equal to about 20 mm to less than or equal to about 40 mm, the height H3 may be greater than or equal to about 10 mm to less than or equal to about 18 mm, optionally greater than or equal to about 10 mm to less than or equal to about 13 mm, and the angle θ3 may be within a range of greater than or equal to about 3 degrees to less than or equal to about 40 degrees, optionally greater than or equal to about 3 degrees to less than or equal to about 10 degrees, and in certain variations, optionally greater than or equal to about 5 degrees to less than or equal to about 10 degrees.

Thus, each respective elongate fourth corrugation 96 is spaced apart from adjacent elongate fourth corrugations 96 at predetermined intervals (e.g., at widths WB3). The fourth corrugation surface 94 may have an overall periodic shape with a period of oscillation P4. Further, the fourth corrugation surface 94 may further define an undulated surface pattern with a predetermined periodicity at least along the top wall 98. As shown in FIG. 4, the fourth corrugation surface 94 also further defines the undulated surface pattern along side walls 102 and bottom walls 106 in FIG. 4. A sinusoidal, and periodic, wave pattern 110 thus defines the undulated surface pattern having a period of oscillation P5 and a height H4. The wave pattern 110 may include raised and non-raised portions, or ebbs 114 and flows 116, throughout the overall periodic shape of the undulated surface. The period P5 and height H4 for the wave pattern 110 is less than the period P4 and the height H3 for the overall periodic shape defining the fourth corrugation surface 94. In certain aspects, the period P5 may be less than or equal to about ⅓ of a width (WT3) of the top wall 98.

In certain variations, the support structure of the fourth corrugation surface 94 is formed of a composite material, such as a carbon-fiber reinforced thermoplastic polymer composite material. The composite material has a Young's modulus (E) of greater than or equal to about 20 GPa to less than or equal to about 30 GPa, in certain aspects. In certain particular variations, a ratio of height (e.g., H3) the corrugation side wall 102 to Young's modulus (E) of the support structure material is greater than or equal to about 0.4 mm/GPa to less than or equal to about 1 mm/GPa, optionally greater than or equal to about 0.4 mm/GPa to less than or equal to about 0.75 mm/GPa, and in certain aspects, optionally greater than or equal to about 0.4 mm/GPa to less than or equal to about 0.65 mm/GPa.

The fourth corrugation surface 94 thus incorporates certain particularly desirable features of the second corrugation surface 62 and the third corrugation surface 90 and combines them into a single corrugation shape. The shorter height H3, narrower width WT3 and WB3, and decreased period P4 (e.g., larger number of corrugations 96) allow for increased performance or a greater ability to withstand impact.

For example, the fourth corrugation surface 94 distributes a concentrated impact load to wider area. Considering automotive and vehicle applications, small stones, small objects, or corners of cements blocks or bricks are typical examples of concentrated impact loads. Usually these objects have a relatively small radius (e.g., r of around 10 mm), so that a pitch and height (e.g., H3) of the fourth corrugation surface 94 is periodic, while the undulated surface wave pattern 110 has been designed that at least two surface will contact to such object has small radius and splitting the load from this object to wider area.

During impact, the energy distributed to the corrugated surface regions, like fourth corrugation surface 94, or the impact energy, is dissipated or stored elastically, thus reducing the probability of failure during impact. The presence of the undulated surface wave pattern 110 within the overall periodic shape increases the performance of the fourth corrugation surface 94 during small, high-speed impacts. The curvature increases the stiffness and strength of the local corrugations.

The present disclosure thus contemplates an impact resistant component for a vehicle that includes a support structure comprising a plurality of elongate ridges formed therein. Each respective elongate ridge comprises a top wall and two side walls. Further, each respective elongate ridge of the plurality is spaced apart from adjacent elongate ridges of the plurality at predetermined intervals. The support structure further comprises an undulated surface with a predetermined periodicity along the top wall thus forming a corrugated surface capable of load-carrying. The support structure is impact resistant. In certain variations, the support structure is capable of withstanding greater than or equal to about 20 Joules of impact energy before cracking under the test conditions previously described above. In certain aspects, the undulated surface defines a sine wave profile. In other aspects, the predetermined periodicity of the undulated surface is less than or equal to about ⅓ of a width of the top wall. The regions between respective elongate ridges of the plurality of elongate ridges may also have the undulated surface.

Figure 9:
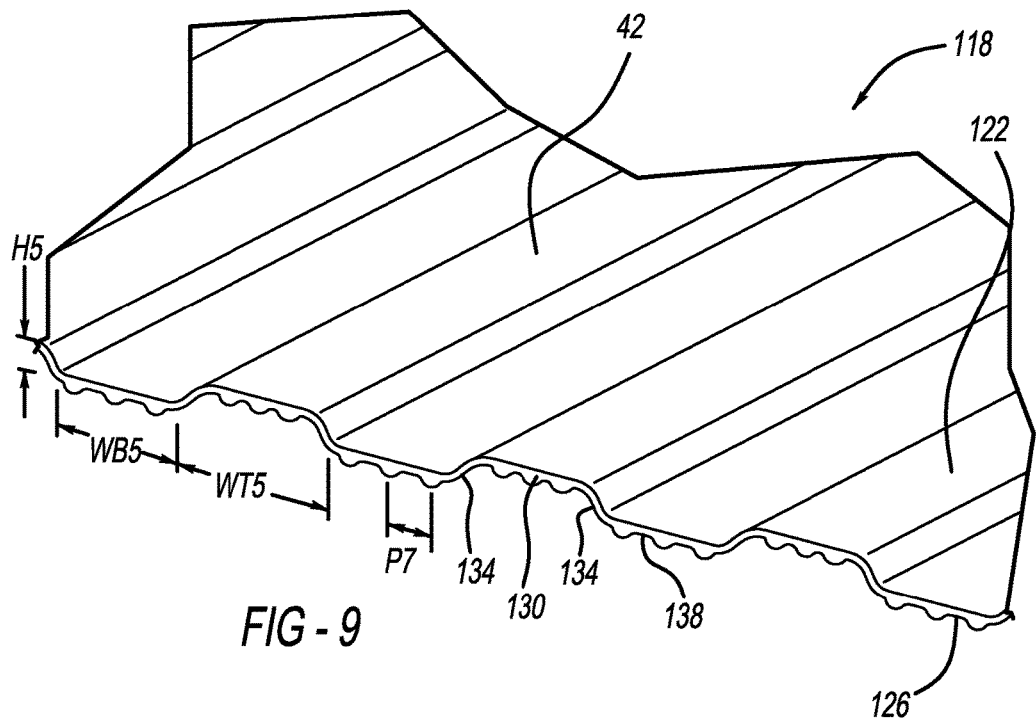
FIG. 9 is a perspective view of the corrugations of FIG. 5A.

In another example embodiment, referring specifically to FIGS. 5A and 9, a fifth corrugation surface 118 is illustrated. FIG. 5A illustrates a section view of the fifth corrugation surface 118, and FIG. 9 illustrates the fifth corrugation surface 118 implemented within the structural component 18. The fifth corrugation surface 118 has a plurality of fifth elongated channels or corrugations 120 at spaced apart predetermined intervals from one another, separated by lower regions or bottom walls 138 disposed therebetween. Each fifth corrugation 120 may include a top side 122 and a bottom side 126, a top wall 130 having a width WT5, a plurality of side walls 134 having a height H5. The bottom wall 138 has a width WT5. The side walls 134 may be at an angle 85 with respect to the line A extending perpendicularly from the bottom wall 138. The widths WT5 and WB5 and the height H5 of the fifth corrugation surface 118 are reduced from the widths WT1 and WB1 and the height H1 of the first corrugation surface 56 (FIG. 2) to increase the energy absorbed during impact.

For example, the widths WT5 and WB5 and the height H5 may be any of those described above in the context of the second corrugation surface 62 (as WT2, WB2, H2, and the like). The width WT5 of the fifth corrugation surface 118 may be within a range of greater than or equal to about 20 mm to less than or equal to about 35 mm, the width WB5 may be within a range of greater than or equal to about 20 mm to less than or equal to about 40 mm, the height H5 may be within a range of greater than or equal to about 10 mm to less than or equal to about 18 mm, optionally greater than or equal to about 10 mm to less than or equal to about 13 mm, and the angle θ5 may be within a range of greater than or equal to about 3 degrees to less than or equal to about 40 degrees, optionally greater than or equal to about 3 degrees to less than or equal to about 10 degrees, and in certain variations, optionally greater than or equal to about 5 degrees to less than or equal to about 10 degrees.

As noted above, in certain variations, the material comprises a composite material, such as a carbon-fiber reinforced thermoplastic polymer composite material. The composite material has a Young's modulus (E) of greater than or equal to about 20 GPa to less than or equal to about 30 GPa, in certain aspects. In certain particular variations, a ratio of height (e.g., H5) the corrugation side wall 134 of Young's modulus (E) of the support structure material is greater than or equal to about 0.4 mm/GPa to less than or equal to about 1 mm/GPa, optionally greater than or equal to about 0.4 mm/GPa to less than or equal to about 0.75 mm/GPa, and in certain aspects, optionally greater than or equal to about 0.4 mm/GPa to less than or equal to about 0.65 mm/GPa.

The fifth corrugation surface 118 may have an overall periodic shape with a period of oscillation P6. The fifth corrugation surface 118 may also have a plurality of protrusions 142 disposed on the fifth corrugation 120. The protrusions 142 may be nubs, disposed in a generally periodic profile, namely a sinusoidal and periodic wave pattern, on the bottom side 126 having a period of oscillation P7 and a height H6. By "generally periodic profile," it is meant that the pattern of protrusions 142 are spaced at regular intervals or distances from one another defining periods, although a small amount of variation in spacing (e.g., less than about 10%) is contemplated. The period P7 and height H6 for the wave pattern is less than the period P6 and the height H5 for the overall periodic shape that defines the fifth corrugation surface 118. It should be noted that the protrusions for any of the embodiments described herein are not limited merely to the number, spacing, placement, or shapes shown, as variations are contemplated in certain alternative aspects. Further, protrusions may be disposed on other surfaces than those shown or only on certain select corrugation or bottom wall surfaces, or may have different patterns than those shown.

The fifth corrugation surface 118 thus incorporates certain particularly desirable features of the second corrugation surface 62 and the third corrugation surface 90 and combines them into a single corrugation shape. The shorter height H5, narrower widths WT5 and WB5, and decreased period P6 (e.g., larger number of corrugations) allow for increased performance under impact. During impact, the energy distributed to the corrugated surface regions, like fifth corrugation surface 118, or the impact energy, is dissipated or stored elastically, thus reducing the probability of failure during impact. The presence of the wave pattern of protrusions 142 within the overall periodic shape increases the performance of the fifth corrugation surface 118 during small, high-speed impacts. The curvature increases the stiffness and strength of the local corrugations.

FIG. 5B shows an exemplary alternative embodiment of a sixth corrugation surface 118A similar to the fifth corrugation surface 118 in FIG. 5A. To the extent that the features, design, and materials of the sixth corrugation surface 118A are the same as those in the fifth corrugation surface 118 of FIGS. 5A and 9, for brevity they will not be repeated herein. The sixth corrugation surface 118A has a plurality of sixth elongated channels or corrugations 120A at spaced apart predetermined intervals from one another, separated by lower regions or bottom walls 138A disposed therebetween. The widths WT5 and WB5 and height H5 may be the same as those for the fifth corrugation surface 118 described above. A plurality of first protrusions 142A is disposed on a bottom side 126A of the sixth bottom wall 138A (shown as 3 exemplary protrusions for each bottom wall, although not necessarily limited in number). A plurality of second protrusions 142B is disposed on a top side 122A of the sixth corrugation 120A (shown as 3 exemplary protrusions per corrugation, although not necessarily limited in number). The protrusions 142A or 142B may be nubs, disposed in a generally periodic profile, namely a sinusoidal and periodic wave pattern, on the top side 122A and bottom side 126A having a period of oscillation P7 and a height H6. The periods of oscillation P6 and P7, height H6, and the other dimensions and advantages discussed previously above in the context of the fifth corrugation surface 118 design in FIG. 5A equally apply to the sixth corrugation surface 118A design in FIG. 5B.

FIG. 5C shows an exemplary alternative embodiment of a seventh corrugation surface 118B similar to the fifth corrugation surface 118 in FIG. 5A. To the extent that the features, design, and materials of the seventh corrugation surface 118B are the same as those in the fifth corrugation surface 118 of FIGS. 5A and 9, for brevity they will not be repeated herein. The seventh corrugation surface 118B has a plurality of seventh elongated channels or corrugations 120B at spaced apart predetermined intervals from one another, separated by lower regions or bottom walls 138B disposed therebetween. The widths WT5 and WB5 and height H5 may be the same as those for the fifth corrugation surface 118 described above. A plurality of first protrusions 142C is disposed on a bottom side 126B of the seventh corrugation 120B and the seventh bottom wall 138B (shown as 1 exemplary protrusion per corrugation or bottom wall, although not necessarily limited in number). A plurality of second protrusions 142D is disposed on a top side 122B of the seventh corrugation 120B and top side 122B of bottom wall 138B (shown as 2 exemplary protrusions per corrugation or bottom wall, although not necessarily limited in number). The protrusions 142C or 142D may be nubs, disposed in a generally periodic profile, namely a sinusoidal and periodic wave pattern, on the top side 122B and bottom side 126B having a period of oscillation P7 and a height H6. The periods of oscillation P6 and P7, height H6, and the other dimensions and advantages discussed previously above in the context of the fifth corrugation surface 118 design in FIG. 5A equally apply to the seventh corrugation surface 118B design in FIG. 5C.

Figure 5D:
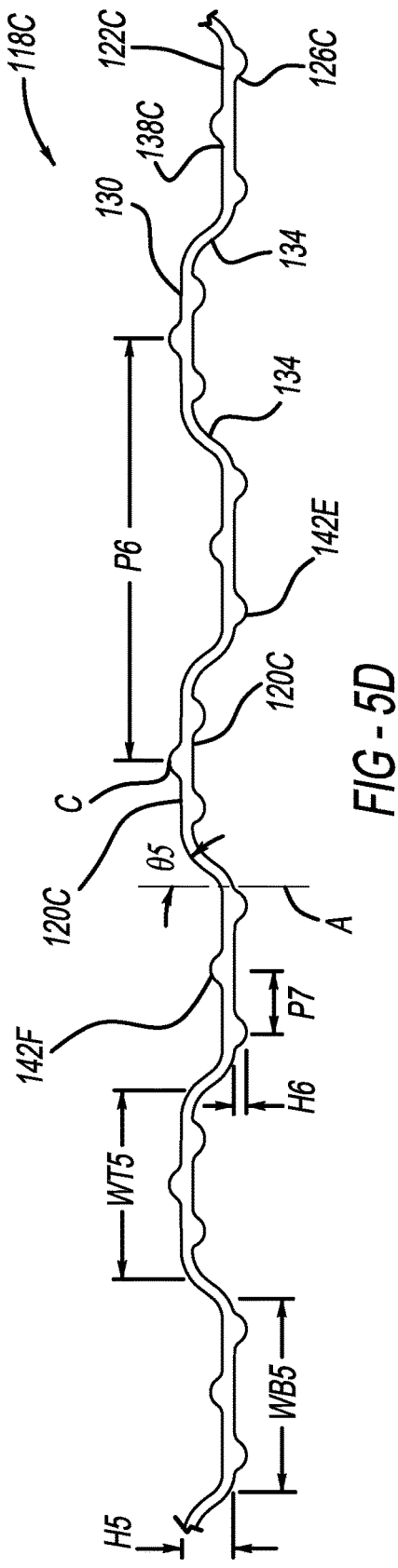

FIG. 5D shows an exemplary alternative embodiment of an eighth corrugation surface 118C similar to the fifth corrugation surface 118 in FIG. 5A. To the extent that the features, design, and materials of the eighth corrugation surface 118C are the same as those in the fifth corrugation surface 118 of FIGS. 5A and 9, for brevity they will not be repeated herein. The eighth corrugation surface 118C has a plurality of eighth elongated channels or corrugations 120C at spaced apart predetermined intervals from one another, separated by lower regions or bottom walls 138C disposed therebetween. The widths WT5 and WB5 and height H5 may be the same as those for the fifth corrugation surface 118 described above. A plurality of first protrusions 142E is disposed on a bottom side 126C in the regions corresponding to the eighth corrugation 120C and of bottom wall 138C (shown as 2 exemplary protrusions per corrugation or bottom wall, although not necessarily limited in number). Notably, the design of the eighth corrugation surface 118C is quite similar to the design of the seventh corrugation surface 118B in FIG. 5C; however, as shown, there is only a single protrusion 142C per seventh corrugation 120B or bottom wall 138B along the bottom side 126B in FIG. 5C, while in FIG. 5D there are two protrusions 142E on each eighth corrugation 120C and bottom wall 138C along bottom side 126C. Further, a plurality of second protrusions 142F (shown as 1 exemplary protrusion per corrugation or bottom wall, although not necessarily limited in number) is disposed on a top side 122C of the eighth corrugation 120C and of bottom wall 138C in FIG. 5D. Again, this is similar to design of the seventh corrugation surface 118B in FIG. 5C; however, as shown, there are two second protrusions 142D on the top side 122B of each seventh corrugation 120B and bottom wall 138B in FIG. 5C, while in FIG. 5D there is only a single second protrusion 142F on the top side 122C of the eighth corrugation 120C and bottom wall 138C. The protrusions 142E or 142F in FIG. 5D may be nubs, disposed in a generally periodic profile, namely a sinusoidal and periodic wave pattern, on the top side 122C and bottom side 126C having a period of oscillation P7 and a height H6. The periods of oscillation P6 and P7, height H6, and the other dimensions and advantages discussed previously above in the context of the fifth corrugation surface 118 design in FIG. 5A equally apply to the eighth corrugation surface 118C design in FIG. 5D.

Figure 5E:
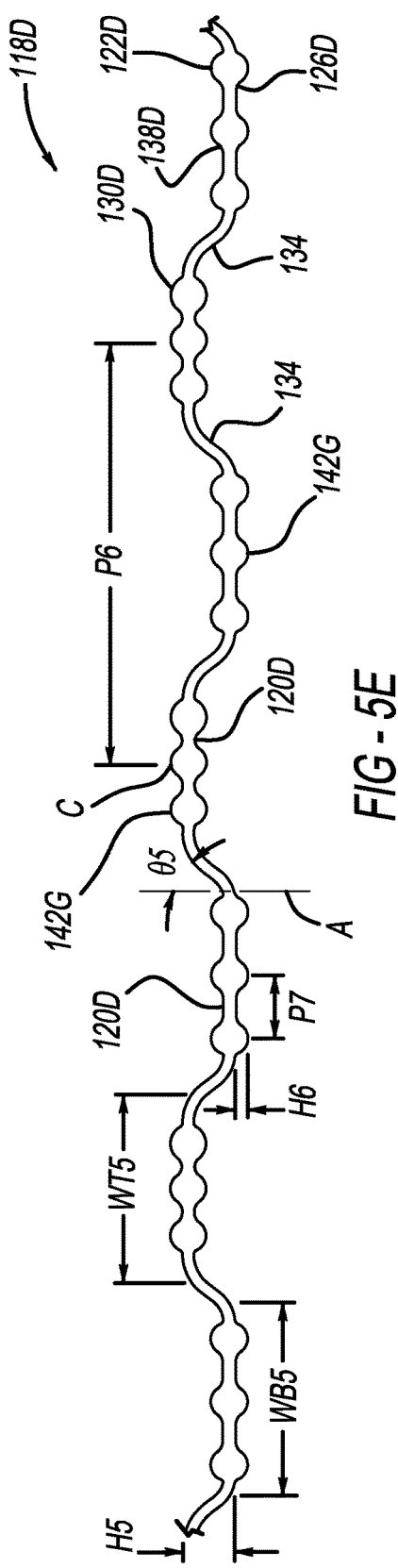

FIG. 5E shows an exemplary alternative embodiment of a ninth corrugation surface 118D similar to the fifth corrugation surface 118 in FIG. 5A. To the extent that the features, design, and materials of the ninth corrugation surface 118D are the same as those in the fifth corrugation surface 118 of FIGS. 5A and 9, for brevity they will not be repeated herein. The ninth corrugation surface 118D has a plurality of ninth elongated channels or corrugations 120D at spaced apart predetermined intervals from one another, separated by lower regions or bottom walls 138D disposed therebetween. The widths WT5 and WB5 and height H5 may be the same as those for the fifth corrugation surface 118 described above. A top wall 130D is defined by the ninth corrugation 120D, which includes a plurality of protrusions 142G (shown as 3 exemplary protrusions per corrugation or bottom wall, although not necessarily limited in number). The protrusions 142G extend or protrude from the top wall 130D on both the top side 122D and the bottom side 126D of the ninth corrugation 120D. Further, the bottom wall 138D likewise comprises the plurality of protrusions 142G (shown as 3 exemplary protrusions, although not necessarily limited in number), which likewise extend or protrude on both the top side 122D and the bottom side 126D. The protrusions 142G may be nubs or thickened regions formed within the body of the ninth corrugation surface 118D, disposed in a generally periodic profile, namely a sinusoidal and periodic wave pattern, on the top side 122D and bottom side 126D having a period of oscillation P7 and a height H6 on each side (top side 122D and bottom side 126D). The periods of oscillation P6 and P7, height H6, and the other dimensions and advantages discussed previously above in the context of the fifth corrugation surface 118 design in FIG. 5A equally apply to the ninth corrugation surface 118D design in FIG. 5E.

Figure 6A:
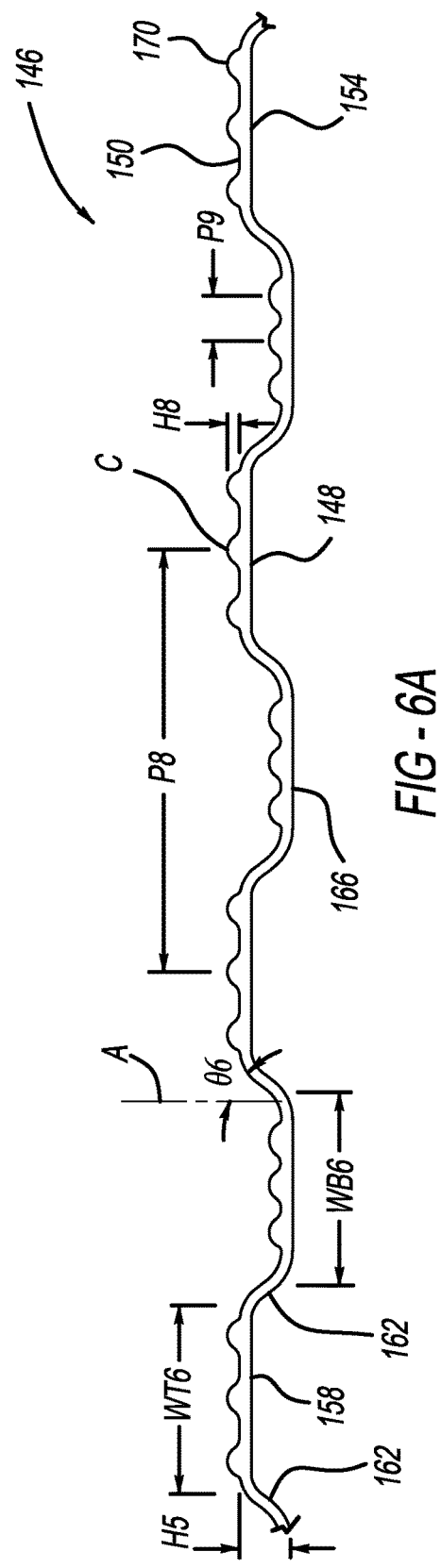
Figure 10:
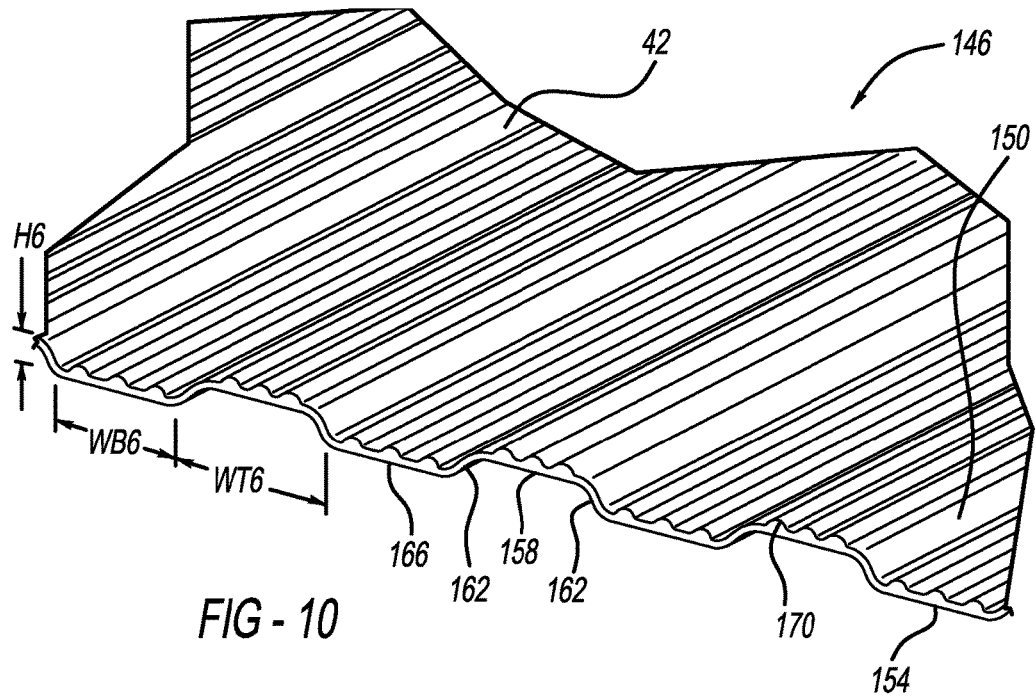
FIG. 10 is a perspective view of the corrugations of FIG. 6A.

In another example embodiment, referring specifically to FIGS. 6A and 10, a tenth corrugation surface 146 is illustrated. FIG. 6A illustrates a section view of the tenth corrugation surface 146, and FIG. 10 illustrates the tenth corrugation surface 146 implemented within the structural component 18. The tenth corrugation surface 146 has a plurality of tenth elongated channels or corrugations 148 at spaced apart predetermined intervals from one another, separated by lower regions or bottom walls 166 disposed therebetween. Each tenth corrugation 148 may include a top side 150 and a bottom side 154, a top wall 158 having a width WT6, a plurality of side walls 162 having a height H7. The bottom wall 166 has a width WB6. The side walls 162 may be at an angle θ6 with respect to line A extending perpendicularly from the bottom wall 166. The widths WT6 and WB6 and the height H7 of the tenth corrugation surface 146 are reduced from the widths WT1 and WB1 and the height H1 of the first corrugation 58 (FIG. 2) to increase the energy absorbed during impact.

The widths WT6 and WB6 and the height H7 may be any of those described above in the context of the second corrugation surface 62 (as WT2, WB2, H2, and the like). By way of example only, the width WT6 of the tenth corrugation surface 146 may be within a range of greater than or equal to about 20 mm to less than or equal to about 35 mm, the width WB6 may be within a range of greater than or equal to about 20 mm to less than or equal to about 40 mm, the height H7 may be within a range of greater than or equal to about 10 mm to less than or equal to about 18 mm, optionally greater than or equal to about 10 mm to less than or equal to about 13 mm, and the angle θ6 may be within a range of greater than or equal to about 3 degrees to less than or equal to about 40 degrees, optionally greater than or equal to about 3 degrees to less than or equal to about 10 degrees, and in certain variations, optionally greater than or equal to about 5 degrees to less than or equal to about 10 degrees. The tenth corrugation surface 146 may have an overall periodic shape with a period of oscillation P8.

In certain variations, the support structure is formed of a composite material, such as a carbon-fiber reinforced thermoplastic polymer composite material. The composite material has a Young's modulus (E) of greater than or equal to about 20 GPa to less than or equal to about 30 GPa, in certain aspects. In certain particular variations, a ratio of height (e.g., H7) the corrugation side wall 162 to Young's modulus (E) of the support structure material is greater than or equal to about 0.4 mm/GPa to less than or equal to about 1 mm/GPa, optionally greater than or equal to about 0.4 mm/GPa to less than or equal to about 0.75 mm/GPa, and in certain aspects, optionally greater than or equal to about 0.4 mm/GPa to less than or equal to about 0.65 mm/GPa.

The tenth corrugation surface 146 may also have a plurality of protrusions 170 disposed on the tenth corrugation 148. The protrusions 170 may be nubs, disposed in a sinusoidal and periodic wave pattern on the top side 150 having a period of oscillation P9 and a height H8. The tenth corrugation surface 146 may essentially be the fifth corrugation surface 118 with the wave pattern of protrusions 170 on the top side 150 instead of the bottom side 154 as illustrated in FIG. 5A in relation to the fifth corrugation surface 118. The period P9 and height H8 for the wave pattern of protrusions 170 is less than the period P8 and the height H7 for the overall periodic shape to define the tenth corrugation surface 146.

The tenth corrugation surface 146 thus incorporates certain particularly desirable features of the second corrugation surface 62 and the third corrugation surface 90 and combines them into a single corrugation shape. The shorter height H7, narrower widths WT6 and WB6, and decreased period P8 (e.g., larger number of corrugations) allow for increased performance under impact. During impact, the energy distributed to the corrugated surface regions, like the tenth corrugation surface 146, or the impact energy, is dissipated or stored elastically, thus reducing the probability of failure during impact. The presence of the protrusions 170 in a wave pattern within the overall periodic shape increases the performance of the tenth corrugation surface 146 during small, high-speed impacts. The curvature increases the stiffness and strength of the local corrugations.

FIG. 6B shows an exemplary alternative embodiment of an eleventh corrugation surface 146A similar to the tenth corrugation surface 146 in FIG. 6A. To the extent that the features, design, and materials of the eleventh corrugation surface 146A are the same as those in the tenth corrugation surface 146 of FIGS. 6A and 10, for brevity they will not be repeated herein. The eleventh corrugation surface 146A has a plurality of eleventh elongated channels or corrugations 148A at spaced apart predetermined intervals from one another, separated by lower regions or bottom walls 166A disposed therebetween. The widths WT5 and WB5 and height H5 may be the same as those for the tenth corrugation surface 146 described above. A plurality of first protrusions 170A (shown as 3 exemplary protrusions per corrugation, although not necessarily limited in number) is disposed on a bottom side 154A of each eleventh corrugation 148A. A plurality of second protrusions 170B (shown as 3 exemplary protrusions per bottom wall, although not necessarily limited in number) is disposed on a top side 150A of the eleventh bottom wall 166A. The protrusions 170A or 170B may be nubs, disposed in a generally periodic profile, namely a sinusoidal and periodic wave pattern, on the top side 150A and bottom side 154A having a period of oscillation P7 and a height H6. The periods of oscillation P6 and P7, height H6, and the other dimensions and advantages discussed previously above in the context of the tenth corrugation surface 146 design in FIG. 6A equally apply to the eleventh corrugation surface 146A design in FIG. 6B.

FIG. 6C shows an exemplary alternative embodiment of a twelfth corrugation surface 146B similar to the tenth corrugation surface 146 in FIG. 6A. To the extent that the features, design, and materials of the twelfth corrugation surface 146B are the same as those in the tenth corrugation surface 146 of FIGS. 6A and 10, for brevity they will not be repeated herein. The twelfth corrugation surface 146B has a plurality of twelfth elongated channels or corrugations 148B at spaced apart predetermined intervals from one another, separated by lower regions or bottom walls 166B disposed therebetween. The widths WT5 and WB5 and height H5 may be the same as those for the tenth corrugation surface 146 described above. A plurality of first protrusions 170C (shown as 2 exemplary protrusions per corrugation or bottom wall, although not necessarily limited in number) is disposed on a bottom side 154B of each twelfth corrugation 148B and each bottom wall 166B. A plurality of second protrusions 170D is disposed on a top side 150B of the twelfth bottom wall 166B and twelfth corrugation 148B (shown as 1 exemplary protrusion per corrugation or bottom wall, although not necessarily limited in number). The protrusions 170C or 170D may be nubs, disposed in a generally periodic profile, namely a sinusoidal and periodic wave pattern, on the top side 150B and bottom side 154B having a period of oscillation P7 and a height H6. The periods of oscillation P6 and P7, height H6, and the other dimensions and advantages discussed previously above in the context of the tenth corrugation surface 146 design in FIG. 6A equally apply to the twelfth corrugation surface 146B design in FIG. 6C.

FIG. 6D shows an exemplary alternative embodiment of a thirteenth corrugation surface 146C similar to the tenth corrugation surface 146 in FIG. 6A. To the extent that the features, design, and materials of the thirteenth corrugation surface 146C are the same as those in the tenth corrugation surface 146 of FIGS. 6A and 10, for brevity they will not be repeated herein. The thirteenth corrugation surface 146C has a plurality of thirteenth elongated channels or corrugations 148C at spaced apart predetermined intervals from one another, separated by lower regions or bottom walls 166C disposed therebetween. The widths WT5 and WB5 and height H5 may be the same as those for the tenth corrugation surface 146 described above. A plurality of first protrusions 170E is disposed on a bottom side 154C of the thirteenth corrugation 148C and of bottom wall 166C (shown as 1 exemplary protrusion per corrugation or bottom wall, although not necessarily limited in number). Notably, the design of the thirteenth corrugation surface 146C is quite similar to the design of the twelfth corrugation surface 146B in FIG. 6C; however, as shown, there are two protrusions 170C on the bottom side 166B of each twelfth corrugation 148B and bottom wall 166B in FIG. 6C, while in FIG. 6D there is only a single protrusion 170E on the bottom side 154C of the thirteenth corrugation 148C and bottom wall 166C. Further, a plurality of second protrusions 170F (shown as 2 exemplary protrusions per corrugation or bottom wall, although not necessarily limited in number) is disposed on a top side 150C of the thirteenth corrugation 148C and top side 150C of bottom wall 166C. Again, this is similar to design of the twelfth corrugation surface 146B in FIG. 6C; however, as shown, there are two second protrusions 170F on the top side 150C of each thirteenth corrugation 148C and top wall 166C in FIG. 6D, while in FIG. 6C there is only a single second protrusion 170D on the top side 150B of the twelfth corrugation 148B and bottom wall 166B. The protrusions 170E or 170F may be nubs, disposed in a generally periodic profile, namely a sinusoidal and periodic wave pattern, on the top side 150C and bottom side 154C having a period of oscillation P7 and a height H6. The periods of oscillation P6 and P7, height H6, and the other dimensions and advantages discussed previously above in the context of the tenth corrugation surface 146 design in FIG. 6A equally apply to the thirteenth corrugation surface 146C design in FIG. 6D.

Thus, the present disclosure further contemplates an impact resistant component for a vehicle having a support structure comprising a plurality of elongate ridges formed therein. Each respective elongate ridge of the plurality is spaced apart from adjacent elongate ridges of the plurality at predetermined intervals to form a corrugated surface capable of load-carrying. A plurality of protrusions is disposed on the plurality of elongate ridges. The plurality of protrusions defines a predetermined periodicity. The support structure may comprise a composite material, in certain variations. The support structure is impact resistant. For example, the support structure is be capable of withstanding greater than or equal to about 10 Joules of impact energy before cracking under the test conditions previously described above.

In certain aspects, the composite material is a fiber-reinforced composite comprising a polymer and a carbon fiber. The structural component may be a gas tank protection shield, an underbody shield, a structural panel, an interior floor, a floor pan, a roof, an exterior surface, a storage area, a glove box, a console box, a trunk, a trunk floor, a truck bed, and any combinations thereof. In certain aspects, the vehicle may be a truck and the support structure may be a truck bed floor. In other variations, the plurality of protrusions are further disposed in regions between respective elongate ridges of the plurality of elongate ridges. In certain aspects, the protrusions are nubs.

The support structure comprises a first side and a second opposite side. The plurality of protrusions is disposed on the first side or the second opposite side with a generally periodic profile. In certain aspects, the first side may be a top surface and the second side may be a bottom surface and the plurality of protrusions are disposed on: (i) the second side on the bottom surface, while the top surface of the first side is smooth; (ii) the first side of the top surface, while the bottom surface of the second side is smooth; or (iii) both the top surface of the first side and the bottom surface of the second opposite side.

In certain aspects, when the plurality of protrusions is disposed on the bottom surface of the second side (as in FIG. 5A), the support structure is impact resistant. In certain aspects, the support structure is capable of withstanding greater than or equal to about 10 Joules of impact energy before cracking under the test conditions previously described above. In certain aspects, such an impact resistant component may be capable of withstanding greater than or equal to about 11 Joules of impact energy before cracking, optionally greater than or equal to about 12 Joules, optionally greater than or equal to about 13 Joules, and optionally greater than or equal to about 14 Joules of impact energy before any cracking occurs.

In certain variations, when the plurality of protrusions are disposed on the bottom surface of the second side (as in FIG. 6A), the support structure is impact resistant. In certain variations, the support structure comprises a composite material, such as a carbon-fiber reinforced thermoplastic polymer composite material. The composite material has a Young's modulus (E) of greater than or equal to about 20 GPa to less than or equal to about 30 GPa, in certain aspects. In certain particular variations, a ratio of height of the corrugation side wall to Young's modulus (E) of the support structure material is greater than or equal to about 0.4 mm/GPa to less than or equal to about 1 mm/GPa, optionally greater than or equal to about 0.4 mm/GPa to less than or equal to about 0.75 mm/GPa, and in certain aspects, optionally greater than or equal to about 0.4 mm/GPa to less than or equal to about 0.65 mm/GPa.

In certain aspects, the support structure having such a design is capable of withstanding greater than or equal to about 10 Joules of impact energy before cracking under the test conditions previously described above. In certain aspects, such an impact resistant component may be capable of withstanding greater than or equal to about 11 Joules of impact energy before cracking, optionally greater than or equal to about 12 Joules, optionally greater than or equal to about 13 Joules, optionally greater than or equal to about 14 Joules, optionally greater than or equal to about 15 Joules, optionally greater than or equal to about 16 Joules, optionally greater than or equal to about 17 Joules, optionally greater than or equal to about 18 Joules, optionally greater than or equal to about 19 Joules, optionally greater than or equal to about 20 Joules, optionally greater than or equal to about 21 Joules, and in certain aspects, optionally greater than or equal to about 22 Joules of impact energy before any cracking occurs.

EXAMPLE 1

An impact test is performed on each of the alternative corrugation designs. The impact test involves applying an impact force on a center C (as illustrated in each of the FIGS. 2-4 and 5A and 6A) of an elongated ridge corrugation (e.g., 46) of a carbon-fiber reinforced composite material with a 0.5 inch striker and with the test described previously above. A piece of material having the corrugated surface regions 42 is fixed to a test table. The striker is a 0.5 inch diameter cylindrical rod having a rounded, or hemispherical, end, or tip. A force and/or distance is increased to increase an amount of energy (E=F*d) that is applied in striking the corrugation with the striker. The energy is increased until a crack is formed in the corrugation. The average energy that applies the first crack is then recorded for comparison. The table below illustrates the results of the impact test for each of the figures:

| FIG. Number - Corrugation Design | Energy (J) | Mass Ratio (for structural component only) |
| --- | --- | --- |
| 2 - First Corrugation Surface | 4 | 1.0 |
| 2 - Second Corrugation Surface | 12 | 1.25 |
| 3 - Third Corrugation Surface | 20 | 1.31 |
| 4 - Fourth Corrugation Surface | 22 | 1.32 |
| 5 - Fifth Corrugation Surface | 14 | 1.24 |
| 6 - Tenth Corrugation Surface | 21 | 1.24 |

As shown in the results, the baseline, or first corrugation surface 56, design shows cracks at 4 J of impact energy. The second corrugation surface 62 yields an improvement of 3 times the energy to crack over the first corrugation surface 56. The third corrugation surface 90 yields an improvement of 4 times the energy to crack over the first corrugation surface 56. The fourth corrugation surface 94 yields an improvement of 5 times the energy to crack over the first corrugation surface 56. The fifth corrugation surface 118 yields an improvement of 3.5 times the energy to crack over the first corrugation surface 56. The tenth corrugation surface 146 yields an improvement of 5 times the energy to crack over the first corrugation surface 56.

While the second through fifth and tenth corrugation surfaces all show significant improvement in impact resistance over the conventional design in the first corrugation surface, based on the impact test results, both the fourth corrugation surface 94 and the tenth corrugation surface 146 show particularly desirable corrugation designs having high impact resistance. The corrugation design selected for the corrugated surface regions 42 of the structural component 18 (or any other piece of hardware) may be selected based on test results other than such an impact test, or may be selected based on a plurality of test results, only one of which is the impact test. As appreciated by those of skill in the art, each of the corrugation designs may perform differently as compared to the other corrugation designs for different tests.

Accordingly, in various aspects, the present disclosure provides an impact resistant component for a vehicle having a support structure comprising a corrugated surface capable of load-carrying. The corrugated surface comprises a plurality of elongate ridges formed therein. Each respective elongate ridge of the plurality is spaced apart from adjacent elongate ridges of the plurality at predetermined intervals to form a corrugated surface capable of load-carrying.

In certain preferred aspects, the support structure may comprise a composite material, such as a fiber-reinforced composite comprising a polymer and a carbon fiber. The composite material may have a Young's modulus (E) of greater than or equal to about 20 GPa to less than or equal to about 30 GPa, in certain aspects. In certain particular variations, a ratio of height of the corrugation side wall to Young's modulus (E) of the support structure material is greater than or equal to about 0.4 mm/GPa to less than or equal to about 1 mm/GPa, optionally greater than or equal to about 0.4 mm/GPa to less than or equal to about 0.75 mm/GPa, and in certain aspects, optionally greater than or equal to about 0.4 mm/GPa to less than or equal to about 0.65 mm/GPa.

The support structure is impact resistant and capable of withstanding greater than or equal to about 8 Joules of impact energy before cracking under the test conditions previously described above, optionally greater than or equal to about 9 Joules, optionally greater than or equal to about 10 Joules, optionally greater than or equal to about 11 Joules, optionally greater than or equal to about 12 Joules, optionally greater than or equal to about 13 Joules, optionally greater than or equal to about 14 Joules, optionally greater than or equal to about 15 Joules, optionally greater than or equal to about 16 Joules, optionally greater than or equal to about 17 Joules, optionally greater than or equal to about 18 Joules, optionally greater than or equal to about 19 Joules, optionally greater than or equal to about 20 Joules, optionally greater than or equal to about 21 Joules, optionally greater than or equal to about 22 Joules, optionally greater than or equal to about 23 Joules, and in certain aspects, optionally greater than or equal to about 24 Joules of impact energy before any cracking occurs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An impact resistant component for a vehicle, comprising:
   a support structure comprising a plurality of elongate ridges and a plurality of elongate valleys formed therein, wherein the plurality of elongate valleys are defined between the plurality of elongate ridges and the plurality of elongate ridges are exposed for direct contact with objects, wherein the plurality of elongate ridges defines an undulated surface on the support structure with a predetermined periodicity, wherein the plurality of elongate rides and the plurality of elongate valleys have a period of oscillation that is distinct from the predetermined periodicity of the undulated surface, wherein the undulated surface further comprises raised portions and non-raised portions, wherein the support structure is impact resistant.

2. The impact resistant component of claim 1, wherein the support structure comprises a fiber-reinforced composite material comprising a polymer and a carbon fiber.

3. The impact resistant component of claim 2, wherein the fiber-reinforced composite material has a Young's modulus (E) of greater than or equal to about 20 GPa to less than or equal to about 30 GPa.

4. The impact resistant component of claim 3, wherein each respective elongate ridge comprises a pair of side walls having a height, wherein a ratio of the height of the side walls to the Young's modulus (E) is greater than or equal to about 0.4 mm/GPa to less than or equal to about 1 mm/GPa.

5. The impact resistant component of claim 1, wherein the raised portions and non-raised portions define a wave pattern.

6. The impact resistant component of claim 5, wherein the wave pattern is a sinusoidal wave pattern.

* * * * *